United States Patent [19]
Katzer et al.

[11] Patent Number: 5,493,851
[45] Date of Patent: Feb. 27, 1996

[54] LAWNMOWER

[75] Inventors: Johann Katzer, Neu-Ulm; Wolfgang Lindermeir, Untermarchtal; Franz Lopic, Nersingen; Christian Stephany, Ulm; Werner Kress, Pappelauer Weg 11, 89077 Ulm, all of Germany

[73] Assignee: Werner Kress, Germany

[21] Appl. No.: 303,642

[22] Filed: Sep. 9, 1994

[30]     Foreign Application Priority Data

Sep. 9, 1993 [DE] Germany .......................... 43 30 567.9

[51] Int. Cl.6 .......................... A01D 34/54; A01D 34/74; A01D 34/82
[52] U.S. Cl. .................. 56/13.7; 56/16.9; 56/256
[58] Field of Search .................... 56/13.7, 16.7, 56/16.9, 256; 172/13, 21

[56]                 References Cited

U.S. PATENT DOCUMENTS

| 2,964,896 | 12/1960 | Finocchiaro | 56/16.9 X |
|---|---|---|---|
| 3,183,653 | 6/1962 | Cromwell . | |
| 3,596,450 | 8/1971 | Bewers | 175/21 |
| 3,693,333 | 9/1972 | Bishop | 56/16.9 X |
| 3,743,025 | 7/1973 | Thatcher | 56/16.9 X |
| 3,945,176 | 3/1976 | Vicendese et al. | 56/16.9 X |
| 3,946,543 | 3/1976 | Templeton | 56/16.9 X |
| 4,344,273 | 8/1982 | Jobling et al. | 56/16.7 |
| 5,179,823 | 1/1993 | Pace | 56/16.9 |

FOREIGN PATENT DOCUMENTS

| 034359 | 8/1981 | European Pat. Off. . |
|---|---|---|
| 355365 | 2/1990 | European Pat. Off. . |
| 464809 | 1/1992 | European Pat. Off. . |
| 3120426 | 12/1982 | Germany . |
| 2115666 | 9/1983 | United Kingdom . |

*Primary Examiner*—George A. Suchfield
*Attorney, Agent, or Firm*—Quarles & Brady

[57]                 ABSTRACT

With a limited separating spacing immediately upstream of a mowing implement rotating in a horizontal plane, a lawnmower has an upward extraction implement rotating in the same direction as the advance direction about a horizontal transverse axis and which is located in a common casing, but in a separate casing chamber. The upward extraction implement is disengagingly driven by means of a gear by the drive motor of the mowing implement and is essentially located between the front wheels, which are vertically adjustable for the joint setting of the working height of the two implements. Thus, it is possible to in each case separately and also jointly and simultaneously work with the two implements, so that numerous use possibilities exist.

34 Claims, 9 Drawing Sheets

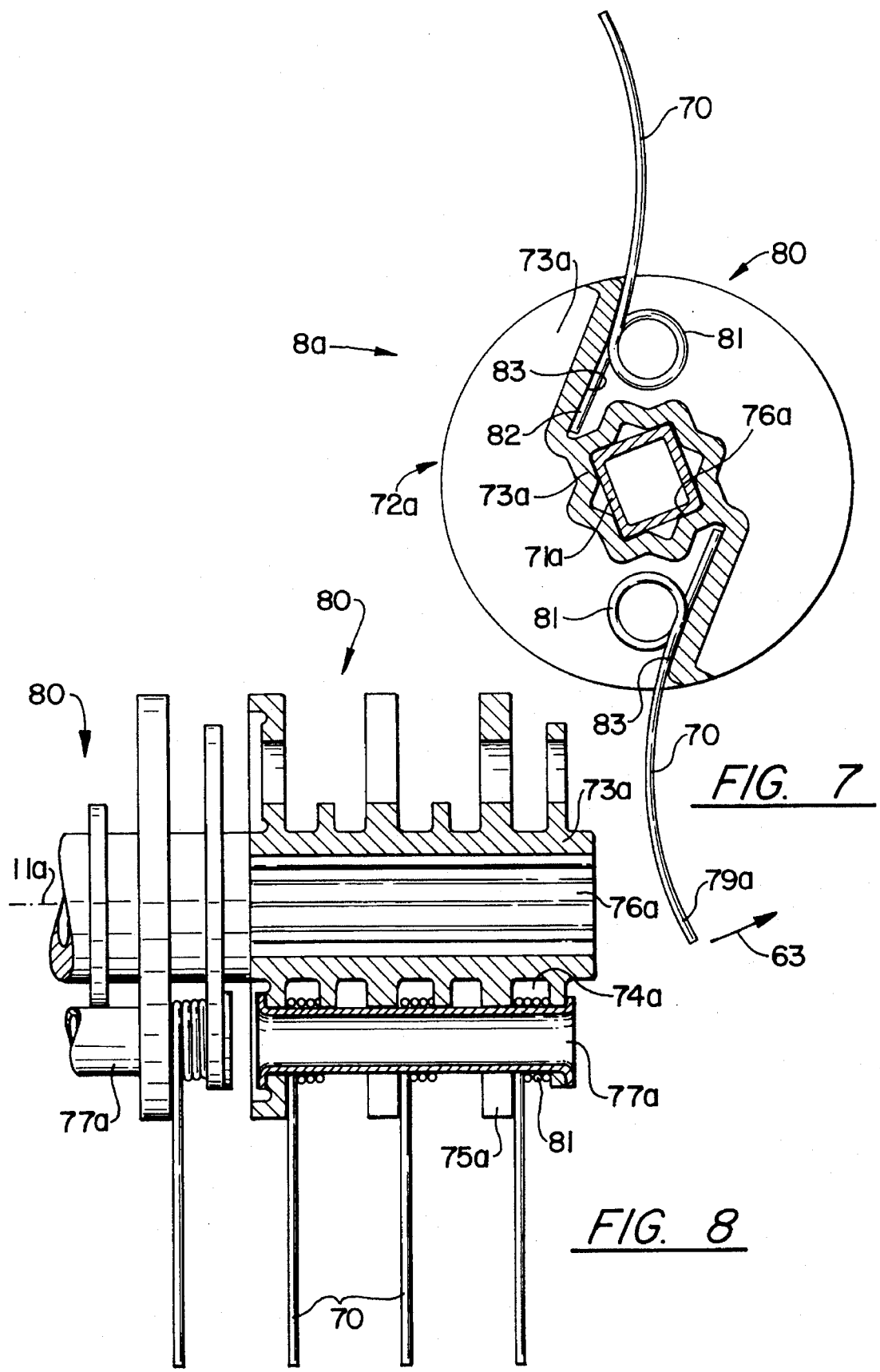

LAWNMOWER

BACKGROUND OF THE INVENTION

The invention relates to a lawnmower, particularly having a shallow or squat construction, with which garden lawns can be mown in such a way that the person mowing guides or pushes the lawnmower in front of him or pulls it behind him. Such lawnmowers have a frame or underframe with which they can be supported on the ground in an inherently stable manner when working, are reliably supported against lateral tilting movements or those roughly parallel to the advance direction and therefore their working implements are moved at a constant height parallel to the ground or running plane. Lawnmowers with a lawn mowing implement axis positioned roughly at right angles to the running plane are generally preferred to those having a position parallel to said plane, the mowing implement having fly cutters for which no counterimplement is required.

There is often a need, in addition to mowing, to carry out other work tasks with such a lawnmower, e.g. scarifying, namely the venting of the ground by tearing out and/or cutting out moss or creeper-like growth, the sweeping together of detached vegetation, etc. For carrying out such different work tasks with a single working implement movable as a whole with respect to the frame is considered preferable to using separate working implements, which are separately mounted spaced from one another without directly interengaging.

It is also preferable to drive the working implement by means of frame wheels as compared with an independent drive, because then the speed of the working movement is not dependent on the advance movement speed, but instead it is optionally possible to work without an advance movement. This more particularly applies for the work carried out in addition to mowing which, as a function of the characteristics of the working area, require different advance speeds.

If the lawnmower has a movement or advance drive, it is speed-controllable or engageable/disengageable at all times during the continuous operation of the working implement.

It would admittedly be possible to provide for the carrying out of additional tasks a separate frame on which the lawnmower is mounted as a whole in such a way that its driven shaft drives the additional tool by means of a gear, but then the mowing implement is not in the readiness or working position and there is also a very considerable constructional expenditure, together with high costs for reequipping to different operation modes.

OBJECTS OF THE INVENTION

An object of the invention is to provide a lawnmower of the aforementioned type, in which the disadvantages of known constructions or of the described nature are avoided and which in addition to mowing can carry out further tasks with high intensity or efficiency essentially independent of whether or how rapidly the lawnmower is moved relative to the ground in the particular advance direction. Moreover, the individual working implements should be selectively engageable and disengageable by simple manual control processes without any reequipping tasks or reciprocal positional adjustment.

SUMMARY OF THE INVENTION

According to the invention at least one additional implement is driveable independently of the advance movement of the frame and/or is integrated together with the mowing implement into a common frame, so that in the same way as the mowing implement essentially it is only free in its working area, but is otherwise so covered on the front, upper area and/or sides that the injury risks as a result of direct contact are largely avoided.

An advantageous constructional integration is also obtained if there are a common drive or drive motor for the mowing implement and the additional implement, the drive connection occurring between the motor and the additional implement even if the mowing implement is installed in the working position or is in rotary working use.

This makes it possible with both working implements simultaneously or with each of said implements to operate independently of the other.

It is particularly appropriate if the additional implement is positioned directly upstream of the travel circle diameter of the mowing implement and/or behind the furthest forward casing wall or boundary of the frame chassis so that despite the provision of the additional implement, compared with a lawnmower without such an implement there is only a slight increase in the overall length. In side view the spacing of the front wheels or the additional implement from the travel circle diameter of the mowing implement can be roughly the same as the corresponding spacing of the rear wheels. Appropriately this spacing is only a fraction of the travel circle radius of the additional implement, which is in turn appropriately much smaller than that of the mowing implement.

In order to ensure that the additional implement does not hurl hard parts, such as stones into the running mowing implement, appropriately between the two working implements a shield is provided, which in the lowest area and above the running plane can be formed solely by a single thin, upright partition and separates from one another two downwardly open cup or channel-shaped casing chambers for the two working implements.

In order to be able to adapt the additional implement to the circumstances of the ground to be worked, the working area formed by its lowermost region is appropriately lower in at least one working position than the running plane defined by the wheels or the like, so that the additional implement passes relatively deeply into the ground or soil and can loosen the latter. It is particularly advantageous if two working implements are jointly continuously adjustable transversely to the running plane and can be fixed in each position and compared with an adjusting movement including a tilting movement of the particular working implement preference is given to a movement in which both working implements are adjusted by the same heights.

This can e.g. be achieved in that wheels provided in only two wheel axes or axles, particularly in front of and behind the mowing implement and located laterally and within the working width of the mowing implement are jointly height-adjustable with respect to the frame chassis, their adjustment or control movement possibly being a pivoting movement about a control or adjusting axis roughly parallel to the associated wheel axis. This control axis is advantageously upstream of the additional implement and/or roughly level with its implement axis and appropriately equiaxial and/or successively positioned wheels are forcibly interconnected with respect to the height adjustment or are adjusted by means of a joint control handle.

The additional implement and in particular its working prongs or teeth can be shielded in large-surface manner by the front ground wheels of the frame, so that they can scarcely touch the foot of an operator over which runs such a wheel. The additional implement is shielded against the adjacent wheel and also by an outermost side wall of the chassis or frame casing, which can carry the mounting support of the additional implement and the control shaft. The additional implement projects at the most by ⅓ to ¼ of its diameter over the underside of said casing. In addition, the wheel axis or shaft of the front wheel can be upstream of the implement axis or shaft of the additional implement or closer to the travel circle diameter, which leads to an even better accident protection.

Whereas appropriately the mowing implement is driven gearless directly by the driven shaft of the motor, for the additional implement, in place of a separate motor, a gear is provided, which is driven by the motor shaft and appropriately the greatest section of the gear connection is above the working implement. For example, in an axial plane of the additional implement fixed with respect to the chassis and at right angles to the running plane or spaced upstream of the motor driven shaft can be mounted an intermediate shaft, which is driven by means of a gear stage and by means of a further gear stage drives the additional implement.

As a result these two gear stages can be reciprocally displaced with a larger spacing, e.g. by approximately half the length of the additional implement. Instead of forming the gear connection by meshing gear wheels, drive shafts, etc., appropriately for bridging the larger connecting sections it has continuously revolving tension or pulling members, e.g. belts. In place of positively acting pull members, such as toothed belts, it is also possible to provide members which have a slip as from a given load and consequently bring about an overload safety action. The particular gear stage, like the intermediate shaft, is advantageously placed in a gear chamber, which is substantially completely separate from the casing chamber for the working implements, so that dirt or the like cannot pass from the casing chamber into the gear chamber.

Advantageously on the substantially closed tops of the casing chambers for the working implements, is mounted a dome-shaped cover covering said casing chambers or tops and which bounds the gear chamber of at least one gear stage over most of its height, so that following the non-destructive removal of said cover the gear stage is accessible from above and laterally over the entire circumference, such as can be advantageous for maintenance, tensioning and changing the belt.

In order to be able to work solely with the particular working implement or independently of the other working implement, the other working implement is appropriately disconnectable with respect to its working movement in that its drive connection is constituted by a manually engageable and disengageable clutch. The latter can be constructed as a frictionally and/or positively acting claw clutch or coupling and is appropriately spring-loaded towards the disengagement position, so that it can be very rapidly opened. Therefore the drive motor runs continuously, but nevertheless e.g. the additional implement can be disconnected and working only takes place with the mowing implement. However, if working is only to take place with the additional implement, this is brought about in that using the mowing implement the grass is initially cut to a given height and then on again passing over said grass the mowing implement with the same or a greater working height no longer cuts and there is instead only an action of the additional implement. Thus, without any vertical adjustability with respect to its working or implement axis it can be arranged in fixed manner on the chassis.

Compared with an arrangement in which the two mowing implements remove from their area the detached vegetation on separate paths, preference is given to an arrangement in which the additional implement transfers said vegetation into the working area of the mowing implement, which in turn passes on the vegetation released by the additional implement e.g. into a storage container located on the chassis and which can be removed for emptying purposes. The relatively coarse vegetation released from the additional implement can thus undergo a further size reduction on passing through the mowing implement and can therefore be particularly advantageously collected.

The drive of the additional implement can take place in spaced manner between its ends and/or on at least one end and the associated gear stage is appropriately located in a gear chamber separate from the additional implement casing chamber. This gear stage can be formed by a revolving tension member of the described type. Advantageously the clutch is located directly on the intermediate shaft and appropriately one gear member is directly formed by the associated pulley and no separate coupling member is required. For the particular gear stage it is also conceivable to have a round cord, flat band, triangular, quadrangular or other belt and compared with an arrangement with a tightener or the like preference is given to an arrangement in which there is no separate tightener for the pull member compared with the deflecting means in the drive force flow. Advantageously the flexible pull member has a low positive or negative thermal expansion coefficient to avoid any need for retensioning after given operating times. It is also conceivable for belt tensioning purposes to construct the conical engagement flanks of a deflecting means of the belt in axially reciprocally adjustable manner, so that the associated deflection radius can be continuously varied. Instead of a pull member from a rubber elastic material it is also possible to use a low-extension textile cord. It is also possible to use a polyester pull member.

Independently of the described constructions the invention also relates to an advantageous construction of the additional implement, which appropriately has working prongs or teeth made from spring steel wire or a material with similar properties. The cross-sectional diameter of these working prongs is appropriately between 0.8 and 1.2 mm. The additional implement can be constructed in modular manner from individual components or implement bodies, which are all essentially identically constructed and in random order can be axially combined.

Thus, in one of eight reciprocally displaced rotation positions each implement body can be so mounted on an implement or profile shaft, that it is positively secured in the particular rotation position against said profile shaft, but can be axially displaced and for the rotation-securing action does not require a frontal engagement in an adjacent implement body. Appropriately there are sufficient implement bodies to ensure that the sum of all the angles of their possible rotation positions gives 360° and also an additional implement body can be provided. Thus, during a revolution, a very uniform and low loading of the additional implement are ensured.

Each implement body appropriately carries several working prongs in axially juxtaposed and circumferentially roughly diametrically mutually displaced manner, so that e.g. only three prongs are simultaneously in engagement. Before said prongs, as a result of their resilient deflection, again suddenly spring back from the ground, the circumferentially following and axially immediately adjacent prongs have started to engage with the ground and move along the ground in the manner of pulled dragging prongs.

The axially juxtaposed working prongs of the particular implement body can be placed on a common bearing or securing member, e.g. a tubular rivet, which traverses spring turns at the foot of the particular prong and radially projecting flanges of the associated hub body and only on its generatrix facing the tool or implement axis can it be supported on such flanges in spaced manner between its ends. The spring turns of the particular prong can engage in substantially axial clearance-free manner between flanges of said type, so that an axial expansion of said turns is not possible.

Compared with an arrangement in which there are more than two working implements in a particular implement axis, preference is given to an arrangement in which there are only two working implements. The working implement rotatable about an axis positioned transversely to the advance direction forms when mowing the furthest forward working implement of the lawnmower. A relatively large travel circle diameter of the additional implement can be achieved if the highest position of this travel circle diameter for the highest position of the additional implement is roughly level with the highest point of at least one wheel with respect to the running plane. For the lowest setting of the chassis with respect to the wheel this highest position can be roughly level with the top of the gear case.

BRIEF FIGURE DESCRIPTION

These and other features can be gathered from the claims, description and drawings and the individual features, both singly and in the form of random subcombinations, can be implemented in an embodiment of the invention and in other fields and can represent advantageous, independently protectable constructions for which protection is claimed here. Embodiments of the invention are described in greater detail hereinafter relative to the drawings, wherein show:

FIG. 1 a lawnmower according to the invention in side view.

FIG. 2 the lawnmower of FIG. 1 in plan view.

FIG. 3 a longitudinal section through part of the lawnmower of FIG. 2.

FIG. 4 another embodiment in a view corresponding to FIG. 3.

FIG. 5 a detail of the lawnmower of FIG. 4 in a part open plan view.

FIG. 6 a section through the lawnmower of FIG. 5.

FIG. 7 an additional implement in axial view.

FIG. 8 an axial section through the additional implement of FIG. 7.

FIG. 9 another embodiment in a view corresponding to FIG. 6.

FIG. 10 the additional implement according to FIG. 9 in an axial view.

FIG. 11 another embodiment of an additional implement in axial section.

FIG. 12 the additional implement according to FIG. 11 in axial view.

DETAILED DESCRIPTION OF PREFERRED EXAMPLE EMBODIMENTS

Figure 1:
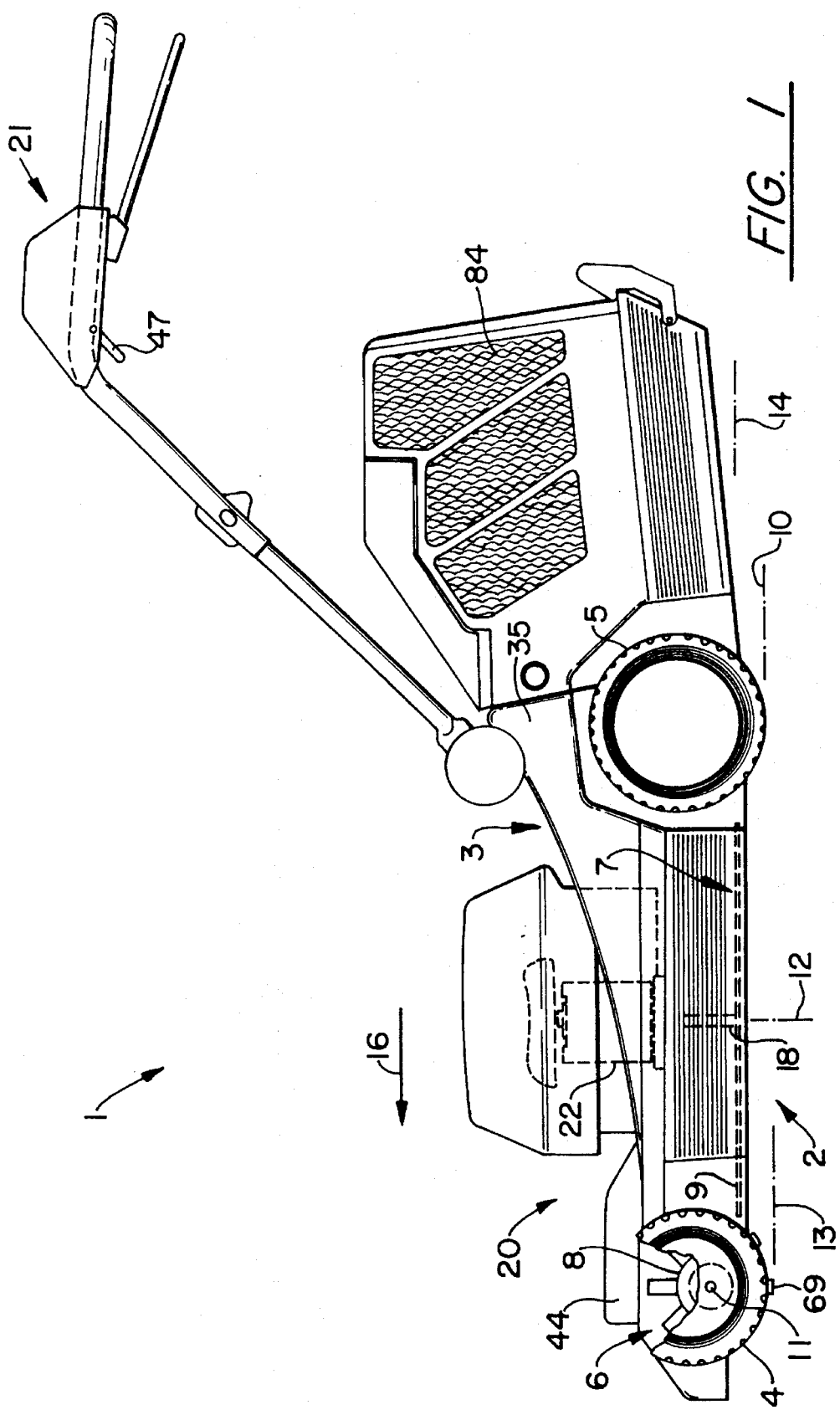

In plan view the lawnmower 1 has an elongated, rectangular chassis 2 with a substantially closed, casing-shaped chassis base 3, on whose front and rear end are in each case located two wheels 4,5, which are substantially freely rotatably mounted about two parallel wheel shafts or axes, the two wheels 4,5 on either side running roughly in the same track and the rear wheels have a larger diameter. Upstream of the rear wheels 5 are provided in successively operating manner two working devices 6,7 and on the top, sides, as well as front and back jointly through the chassis are covered by a casing wall passing substantially completely over both working devices 6,7. In the front end part of the chassis base 3 and approximately at its front end or essentially between the front wheels 4 is provided as a working device an upward extraction device 6, whose working implement in the form of an additional implement 8 in plan view extends roughly to the rear ends of the wheels 4, which passes substantially continuously between its ends over the entire associated working width and which is substantially symmetrical to the median plane of the working area of the rear mowing implement 9 of the mowing device 7 parallel to the median longitudinal plane of the chasis 2. In plan view the travel circle or working area of the mowing implement 9 extends with the exception of a small gap spacing to the rear circumference of the additional implement 8, whereas the rear end of this working area extends approximately up to the front end of the rear wheels 5.

Laterally the working area of the mowing implement 9 extends approximately up to the associated lateral outer boundaries of the chassis base 3, which are inwardly displaced by slightly more than their wheel width in the vicinity of the wheels 4,5, so that the working width of the additional implement 8 is roughly twice said wheel width smaller than the working width of the mowing implement 9. On successively working a lawn in juxtaposed strips, then when working the next following strip the lawnmower 1 can be guided in such a way that the wheels 4,5 on the associated side run on the already worked strip with the insides thereof along its longitudinal boundary and the working width of the mowing implement again works the already worked strip over a width roughly corresponding to the wheel width. The working width of the additional implement 8 is then directly connected to the longitudinal edge of the already worked strip, which leads to a good efficiency and avoids double working of strip areas by the additional implement 8.

The undersides or rolling zones of the wheels 4,5 define a running plane 10 of the lawnmower 1 and to said running plane 10 the working axis 11 of the additional implement 8 is parallel and at right angles to the connecting lines between the two implements 8,9. The working axis 12 of the mowing implement 9 is at right angles to the running plane 10, so that the mowing implement 9 performs its working movement in a working plane 14 parallel to the running plane 10. The mowing implement 9 is e.g. formed by two or more radially freely projecting plate-like fly cutters flat to the working plane 14. The working plane 13 of the additional implement 8 parallel to the running plane 10 is usually lower than the planes 10,14 and is not, as in the case of the mowing implement 9, defined by a front side, but instead by the lowest point of the outer circumference of the additional implement 8. The common wheel axis or shaft 15 of the wheels 4 roughly parallel to the working axis 11 and running plane 10 can be roughly at the same height as said axis 11 and displaced forwards with respect thereto by an amount roughly the same as the travel circle radius of the additional implement 8. As a result of the non-steerable wheels 4,5 is defined a main advance direction 16 of the lawnmower 1, which results from the fact that the person guiding said lawnmower 1 moves on foot behind it. The working axis 11 is roughly at right angles to the advance direction 16.

The diameter of the outermost travel circle 17 of the additional implement 8 is roughly ¾ of the diameter of the wheels 4, so that in plan view it does not extend over the front ends thereof and instead, due to its eccentric position with respect to the wheels 4, projects rearwards and in spaced manner above the running plane 10 above the rear ends of the wheels 4. The smallest spacing between the travel circle diameters of the two working implements 8,9 is much smaller than the diameter of the travel circle 17 and significantly smaller than the travel circle radius of the additional implement 9 and can be roughly ⅕ of the diameter of the travel circle 17 or ⅒ of the travel circle radius of the mowing implement 9, whose travel circle diameter is approximately four times as large as that of the additional implement 8.

The mowing implement 9 is located on the lower end of a mowing shaft 18, which is mounted on a motor or engine flange 19 fixed to the top of the chassis base 3 and is to be driven by a drive means 20. The associated drive motor 22 formed by an electric motor or internal combustion engine appropriately has its driven shaft roughly at right angles to the running plane 10 or in the work axis 12, so that the said driven shaft can directly form or carry the mowing shaft 18 to which the mowing implement 9 is easily detachably fixed by a front screw.

To the rear end of the chassis base 3 is fixed in articulated manner with its two front, lateral legs a bow-shaped guide handle 21 forming above and to the rear of the chassis base 3 a guide grip by means of which the drive means 20 can be switched on and off. Appropriately for the operation of the drive means 20 together with the guide grip a securing or security handle is held in the engagement position, so that on releasing the guide grip necessarily said handle is released and automatically transferred into its disconnected position, which leads to an immediate stopping or drive interruption of the working implements 8,9.

Immediately below the drive motor 22 the mowing shaft 18 has a cross-sectionally e.g. trapezoidal circumferential groove for forming a belt pulley 23 and the latter can drive by means of a gear 24 the additional implement 8. The single-stage gear 24 has two gear sections 25,26 at an angle to one another and which can be mutually offset by an intermediate shaft 27. The intermediate shaft 27 carries above the additional implement 8 and slightly rearwardly displaced with respect thereto, but in front of the mowing implement 9, two equiaxially juxtaposed and independently rotatable pulleys 28,29. A corresponding belt pulley 31 is positioned in spaced manner between the ends of the additional implement 8 or roughly in the centre of the length thereof. From the belt pulley 23 to the pulley 31 is guided a revolving driving belt 32, e.g. a round cord belt, whose two sides or strands are deflected over approximately 90° over the tops of the two pulleys 28,29 and loops the pulley 31 over an arc angle of at least 180°. The intermediate shaft 27 is approximately at right angles to the driven shaft 18 or parallel to the work axis 11, so that the gear 24 operates in the manner of a mitre gear. The pulleys 28,29 can be mounted on a common shaft with bearings 34.

The chassis base 3 forms a casing 35 passing continuously from the front to the rear end of the lawnmower 1, but defines separate casing chambers. The gear 24 is essentially located in one gear chamber 36 shown open in FIG. 3 and is substantially closed with respect to the working implements 8,9 or is only opened where the driven shaft 18 or the drive connections leading to the additional implement 8 pass through. The additional implement 8 is located in a separate casing chamber 37, which is below the front end of the gear chamber 36 and is essentially only open downwards in cup-shaped manner. Immediately to the rear of the casing chamber 37 a casing chamber 38 positioned below the rear end of the gear chamber 36 and serving to receive the mowing implement 9 is connected and in the described manner is only downwardly open in cup-shaped manner.

At the front the casing chamber 37 is bounded by an upright front wall 39, which can form the furthest forward end of the chassis base 3 or lawnmower 1. The two casing chambers 37,38 are separated from one another by an upright partition 40 or a corresponding separating means, adjacent to the two travel circle diameters of the working implements 8,9 except for a gap spacing, and passing continuously over the entire working width of the working implement 8 or 9 and in closed manner. The casing chamber 7 is bounded on the top by a roughly horizontal cover wall 41, which simultaneously forms the bottom wall of the gear chamber 36 and is closed except for an opening for the passage of the drive connection.

A corresponding cover wall 42 roughly level with the cover wall 41 is provided for the casing chamber 38 and an opening in its cover wall 42 is used for the passage of the mowing shaft 18. On the top the gear chamber 36 is closed by a dome-shaped, non-destructively easily detachable and completely removable and/or articulated-openable cover 44, which engages over both casing chambers 37,38 and is mounted with its dome edge on the cover walls 41,42. Thus, substantially all the moving parts of the drive connection for the additional implement 8 are shielded to the outside in an approximately complete manner against accidental contact and injury risks are substantially eliminated. At the rear end the cover 44 has an opening or cutout for the passage of the belt 32.

The deflecting pulleys 28,29 rotatable about the deflection axis 43 extend with their lower crest approximately to the top of the cover wall 41 and with their upper crest approximately to the inside of the cover wall of the cover 44, so that the lawnmower 1 in its front area upstream of the drive motor 22 can be kept so squat that this area can also be passed below relatively low bushes or the like enabling working to take place with the working device 6.

For putting the working device 6 out of operation with the working device 7 running or the drive motor 22 running, a clutch 30 in the form of a friction clutch is provided, whose members can essentially be formed by the belt pulley 23 and the driving belt 32. By releasing the driving belt 32 with respect to its tension the said belt 32, under its own weight can slide from the ring groove of the pulley 23 provided as the coupling member 48, accompanied by radial expansion and in an axially downward manner onto a depositing point, which at least in part ring-like manner surrounds with gap spacing the mowing shaft 18. For this loosening of the belt tension 32 or for the engagement and disengagement is provided an adjusting or control device 46 with which the pulleys 28,29 serving as belt tensioners or tighteners can be adjusted transversely to the axis of the coupling member 45 and to their deflection axis 43 roughly in the longitudinal direction of the lawnmower 1.

For adjustment purposes in the vicinity of the guide grip of the guide handle 21 is provided a handle member 47, which is connected by means of a pull member, such as a Bowden cable, to a displaceable slide carrying the pulleys 28,29. This slide is displaceably mounted against spring tension in a guide 52 roughly parallel to the running plane 10 and the spring tension can act in such a way that it always acts in a retightening manner on the driving belt 32 if the clutch 30 is engaged. If the pulleys 28,29 are adjusted in the direction of the coupling member 45 with the aid of the handle member 47, then the driving belt 32 slides out of the coupling member 45 on the depositing point. If the pulleys 28,29 are then again released for the action of the spring tension, then the pulleys 28,29 tension the driving belt 32 in its disengaged position, so that it slides along a sloping, ramp-like boundary of the depositing point upwards and immediately from the latter into the optionally already rotating coupling member 45, so that the belt 32 can be non-positively entrained in its driving movement and drives the upward extraction device 6. On one or both sides of the pulleys 28,29 can be guided the strands of the driving belt 32 separately or jointly in relatively narrow guide openings.

In place of a mutual adjustability of the working planes 13,14 of the working implements 8,9, at right angles to the running plane they are not or are only adjustable relative to one another by modifying the diameter of the travel circle 17, because the work axis 11 is invariable with respect to the chassis base 3. The casing chambers 37,38 are laterally bounded on either side by side walls 48, which are located on the outside of the chassis base, namely in the narrower area of the additional implement 8 immediately adjacent to the insides of the wheels 4 and in the widened area of the mowing implement 9 in the longitudinal direction between the wheels 4,5. In order to permit a relatively deep working engagement of the additional implement 8, the lower edges 49 of the side walls 48 in the vicinity of the casing chamber 37 are higher than the lower edges 51 in the vicinity of the casing chamber 38, namely at least as high as the lower crest of the roll core of the additional implement 8 over which the working or vertical extraction prongs project radially and freely. The lower edges 51 and also the roughly equally high lower edge of the separating means 40 are somewhat lower than the underside of the mowing implement 9, so that the latter is not accessible from the side and from the casing chamber 37.

However, the working planes 13,14 are jointly adjustable with respect to the running plane 10 with a height adjustment device 50. For this purpose each wheel 4 or 5 is rotatably mounted on a guide rod 54 positioned between its inside and the associated side wall 48 and which is pivotable about the median axis of a control shaft 53 parallel to the wheel axis 15 with respect to the chassis base 3. The median axis of the control shaft 53 is in each setting state upstream of the wheel axis 15, a small distance upstream of the travel circle 17 and roughly level with the work axis 11, the control shaft 53 being rotatably mounted in bearings, which are provided in the side walls 48. The control shaft 53 positively links the two guide rods 54 of the associated wheels 4 and 5, so that both guide rods 54 can be synchronously pivoted.

In spaced manner above the control shaft 53 or the wheel axis 15 is articulated on only one of the guide rods 54 a pull member or control rod 55, which passes roughly parallel to the running plane 10 or to the advance direction 16 above the mowing implement 9 rearwards to a control drive. The control drive is operable with a freely accessible handle 56 on the top of the chassis base 3 and behind the drive motor making it possible to height-adjust together by the same control paths all four wheels 4,5. Thus, the additional implement 8 can be adjusted in such a way that in the highest setting its travel circle 17 is above the running plane 10 by about half its diameter and with the lowest setting is below the running plane 10 by about 1/6 to 1/7 of its diameter.

However, the mowing implement 9 located level with the work axis 11 during each setting is spaced above the running plane 10 by an amount smaller than the diameter of the travel circle 17, but in the highest setting its distance from the running plane 10 is at least 1/2, 2/3 or 3/4 of the diameter of the travel circle 17. Thus, it is possible in simple manner to operate essentially only with the working device 6.

The two working implements 8,9 can also be driven completely independently of one another, e.g. by separate motors and/or in that both implements 6,7 can be disengageably coupled to the driven shaft of the drive motor 22 by means of separate clutches. In the case of a separate motor for the working implement 8 the same can be positioned upstream of the drive motor 22, laterally adjacent to the implement 8 in a separate casing chamber, within the roll core of the implement 8 as an axial suspension motor or equiaxially to the implement 8 and/or at least partly directly above the travel circle 17, as well as as a disk-shaped flat motor or rotary motor, whose casing revolves with the additional implement 8. Appropriately there can be a control drive for the vertical adjustment of the additional implement 8 with respect to the chassis base 3 and between the height adjustment device 50 and the bearings of the additional implement 8 can be provided an optionally disengageable or mechanical control connection through which the implement 8 can be adjusted roughly synchronously with the wheels 4,5 with respect to the chassis base 3. This makes it possible to modify the setting of the working height of the mowing implement 9 independently of the working height of the additional implement 8 and optionally also modify the spacing between the working plane 13 and the running plane 10 or the spacing between the two working planes 13,14, depending on which working action is desired. In the case of an adjustability of the additional implement 8 with respect to the chassis base the at least one deflection means 28 or 29 could also serve as a tension compensating means for the driving belt 32 or for obtaining a substantially constantly identical tension of the driving belt 32 for each setting a separate tightener running on one or more strands of the driving belt 32 could be provided bringing about automatic compensation in resilient manner in both opposite directions transversely to the particular strand or side.

Figure 2:
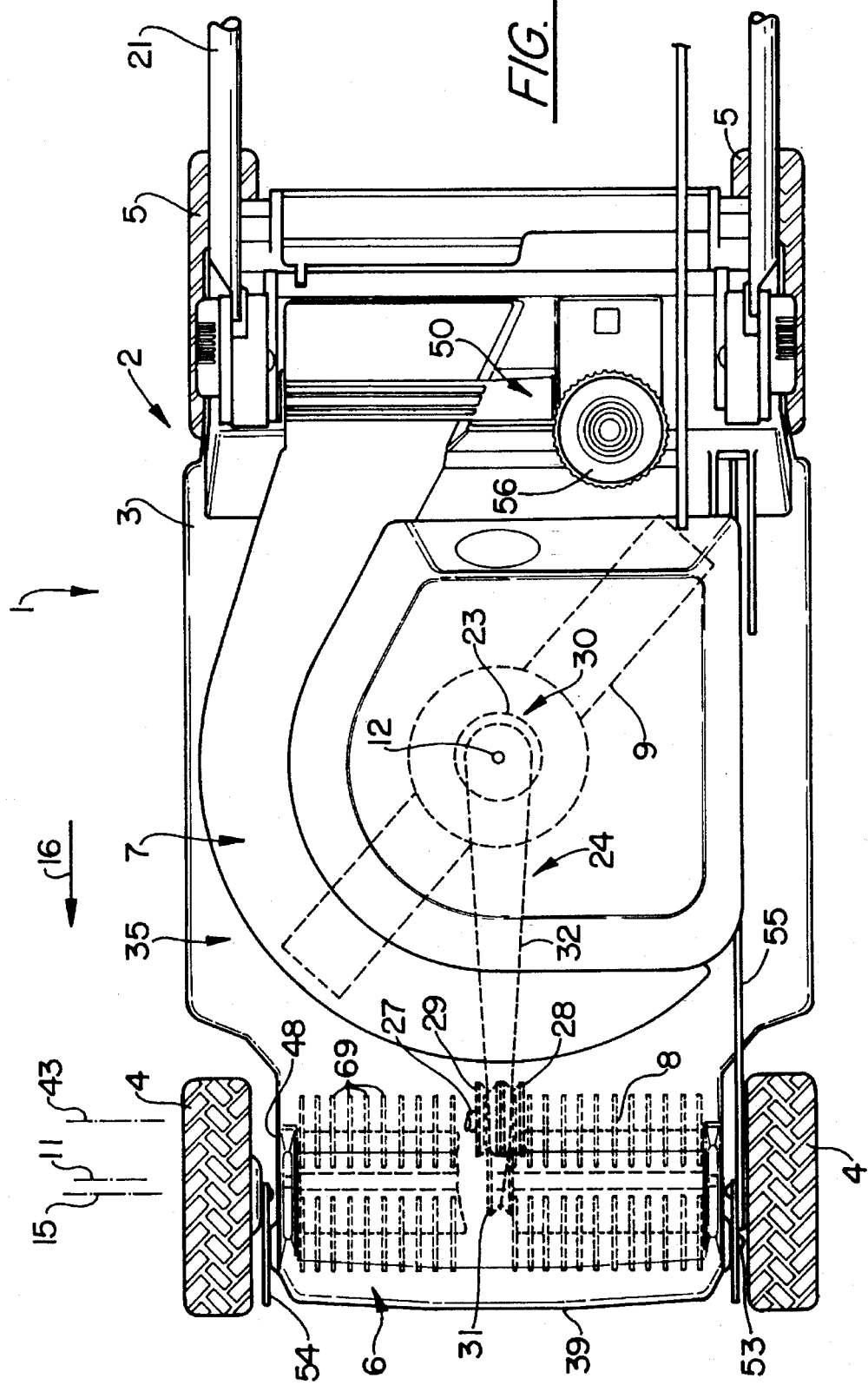
Figure 3:
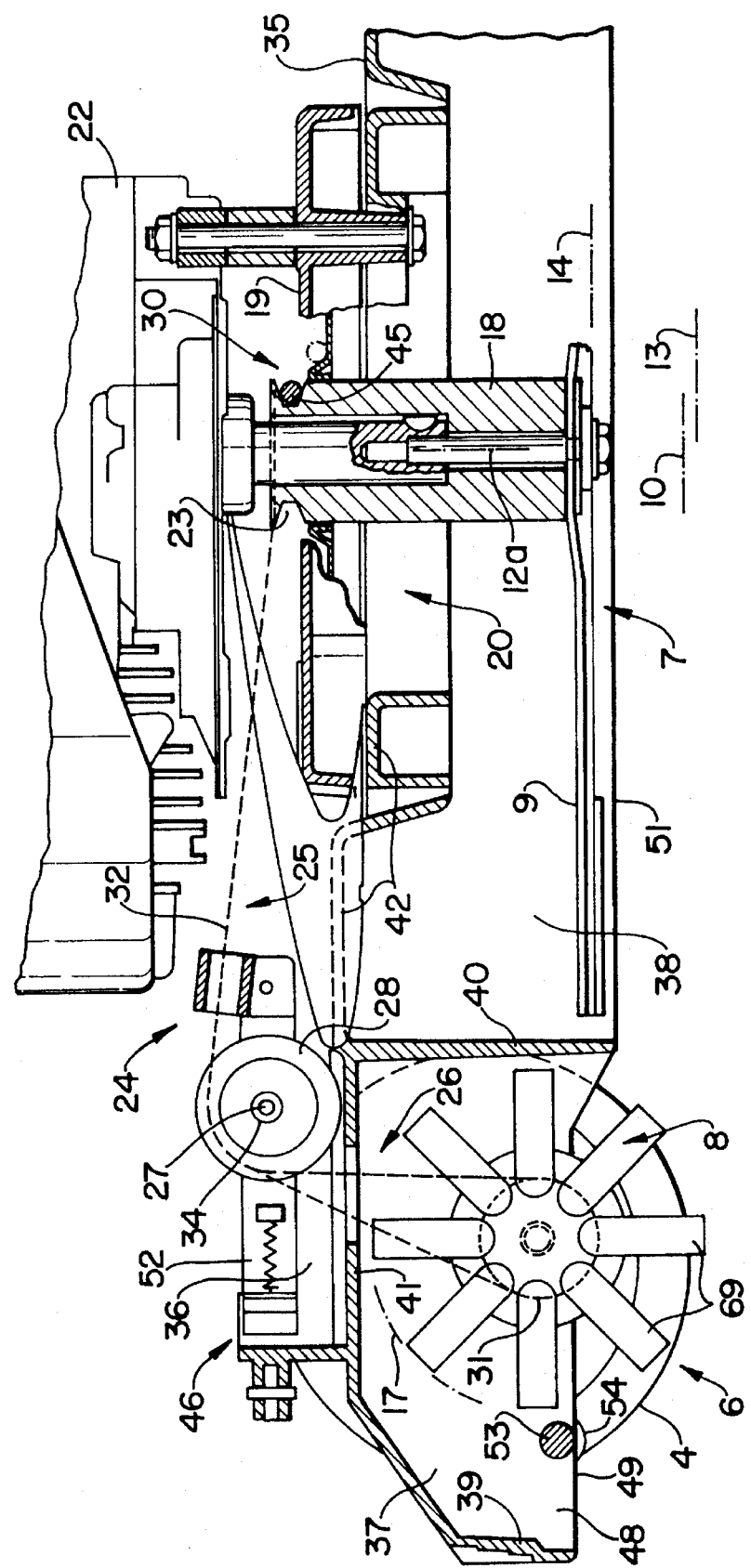

In FIGS. 4 to 12 for corresponding parts the same reference numerals as in FIGS. 1 to 3 are used, but with different letter indexes, so that also all the description parts apply to all the embodiments and all the features or arrangements of the particular embodiment can be provided additionally or alternatively in at least one other embodiment. The embodiments of FIGS. 4 to 12 are shown in the drawings with minor changes.

Whereas in the embodiment according to FIGS. 1 to 3 the gear 25 is constructed only in one-stage form, but in side view with two path sections of the transfer member 32 at an angle to one another on either side of the deflecting means 28,29, the gear 24a has two gear stages 25a,26a with an intermediate shaft 27a and separate transfer members or driving belts 32a,33. The intermediate shaft 27a extending over at least half the length of the working implement 8a is mounted in bearings 34a, which are fixed to the cover wall 41a or 42a and from which the particular one is relatively close to the associated deflecting means 28a or 29a. The pulley 28a is roughly in the central transverse plane of the additional implement 8a, whereas the pulley 29a is slightly laterally outwardly displaced with respect to the associated end of the additional implement 8a, so that in place of a center drive according to FIG. 2 there is a side drive, which is connected so as to engage positively with respect to rotational motion to the shaft of the implement 8a by means of the roller 31a laterally outside the side wall 48a.

Figure 4:
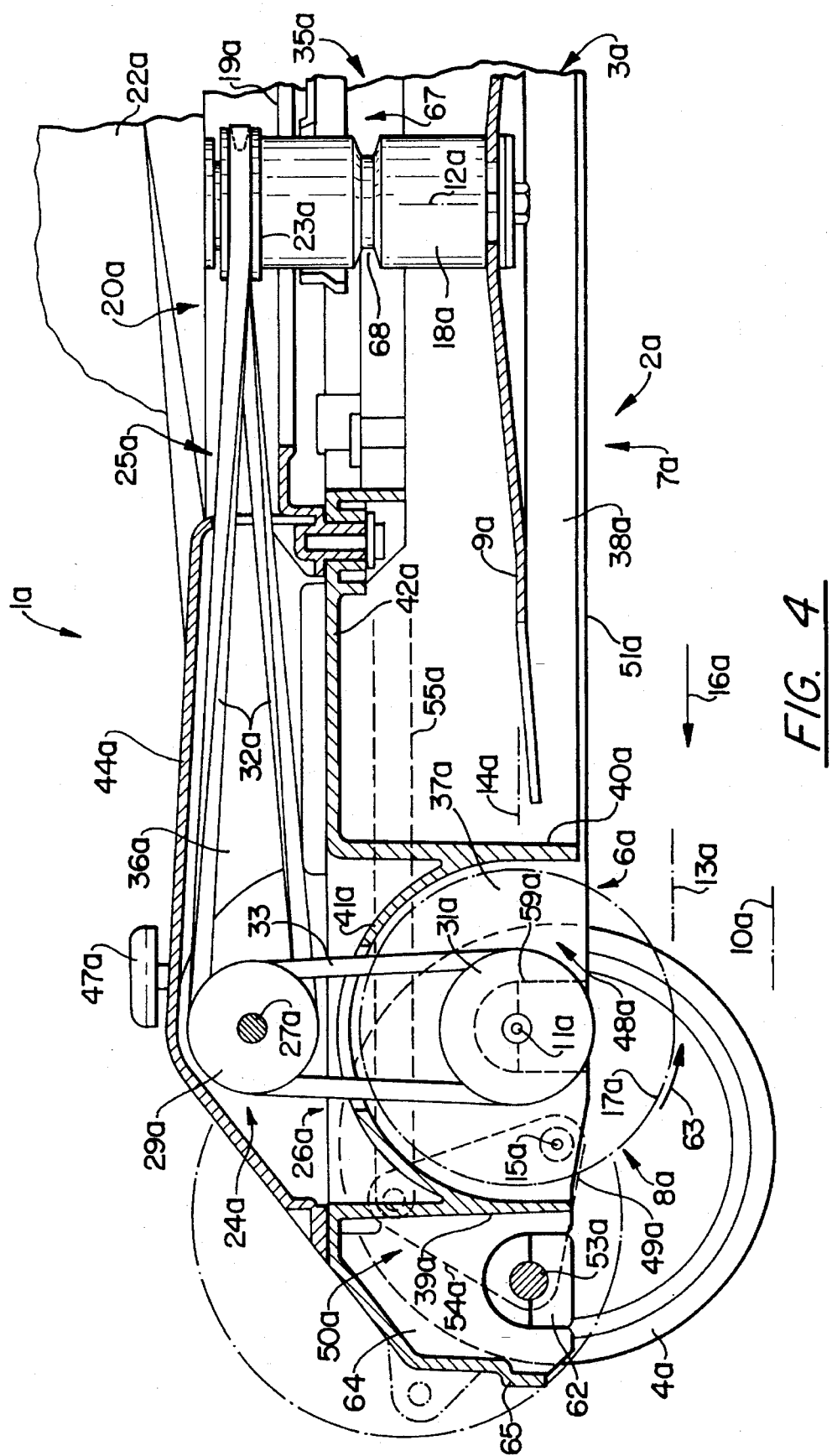
Figure 5:
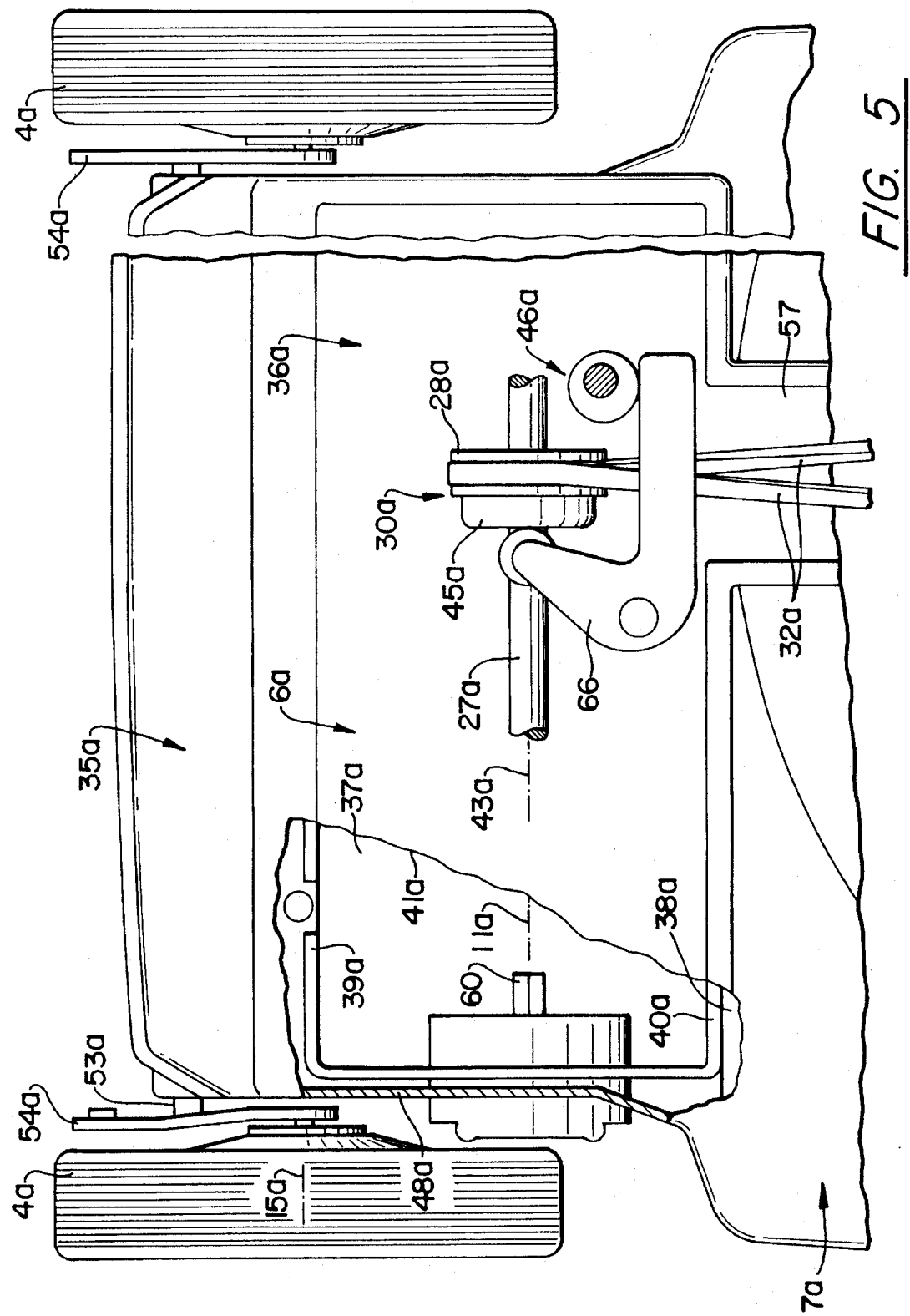

The associated gear stage 26a is substantially located in a shaft of the gear chamber 26a not shown in FIG. 5, said shaft being in side view according to FIG. 4 narrower than the casing chamber 37a. To a shaft 57 much narrower than the length of the additional implement 8a can be reduced the gear chamber 36a in the vicinity of the transfer member 32a and said shaft 57 aligned with the roller 28a is guided roughly in the centre of the width of the chassis base 3 on the top of the cover wall 42a to the roller 23 and after opening the cover 44a is open on the top. If with respect to torsional loads the shaft of the additional implement 8a is to be given relatively weak dimensions, it is also conceivable to provide for both ends of the additional implement 8a substantially identical gear stages 26a which, if the resulting reduction of the working width is not desired can be drive-connected between in each case two adjacent prong arrangements to the additional implement 8a inwardly displaced with respect to the particular end.

Figure 6:
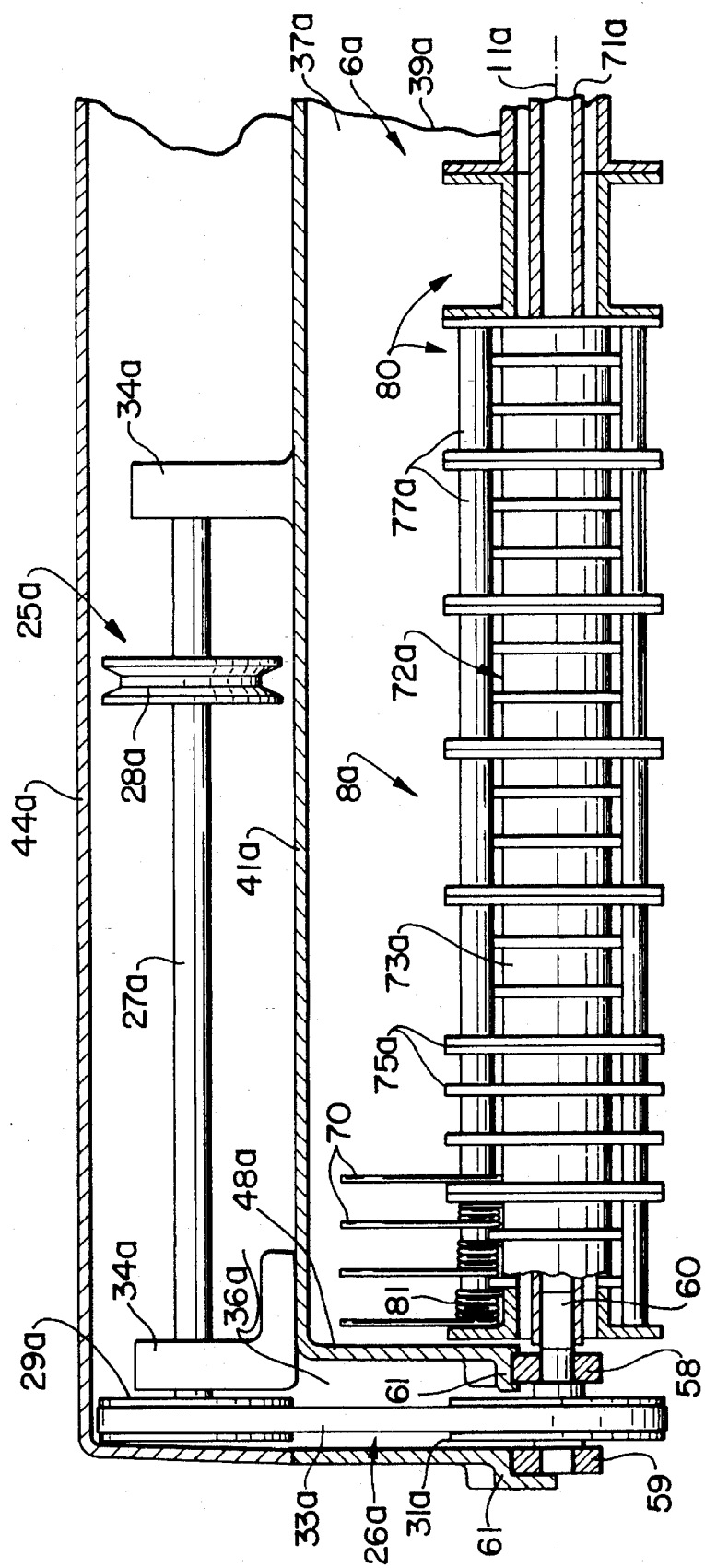

According to FIG. 6 the shaft of the additional implement 8a or the pulley 31a is mounted immediately adjacent on either side of its end faces in in each case one bearing 58,59 and over the inner bearing or over the inside of the side wall 48a projects a coupling pin 60 connected in non-rotary manner to the pulley 31a with which the shaft of the additional implement 8a is drive-connectable by axial mounting. Each bearing 58,59 is fixed in a split support tray of the chassis base 3a and FIG. 6 does not show the lower, non-destructively, easily detachable support trays, which surround the lower circumferential area of the outer rings of the bearings 58,59 and can form a subassembly, which closes the shaft chamber on the underside of the pulley 31a. After removing the lower support trays the additional implement 8a, optionally together with the pulley 31a, can be detached and removed downwards from the chassis base 3a.

In the vicinity of the gear shaft for the gear stage 26a the side wall 48 is doubled, the outer wall part forming the associated lateral outside of the chassis base 3a adjacent to the wheel 4a not shown in FIG. 6. Each of the two wall parts carries one of the bearings 58,59 and forms a corresponding tray 61. For a vertical adjustability of the additional implement 8a with respect to the chassis base 3a the support trays 61 and the associated counter-trays could be displaceably guided in the manner of slides in guides of the associated wall parts 48a roughly at right angles to the running plane 10a, so that also this adjustment can take place substantially continuously like those described hereinbefore. Also an adjustment of the mounting support 59a about an axis parallel to the work axis 11a is conceivable for height adjustment purposes. The mounting support 62 of the control shaft 53a can be fixed in corresponding split support trays of the side wall 48a and therefore detachably connected in the described manner so that both the wheels 4a can be removed together with the guide rods 54a and the control shaft 53a from the chassis base 3a.

FIG. 5 shows a bearing box for the pulley 31a, which projects laterally outwards up to close to the inside of the adjacent wheel 4a over the side wall 48a and inwards slightly over the inside of said side wall 48a. Between the two roughly parallel and spaced parts of said side wall 48a the drive connection can pass to the intermediate shaft 27a. The coupling pin 60 projects over the inside of the bearing box and appropriately has a profile shape diverging from the cylindrical construction, so that merely by axial assembly can be connected in several rotation positions in positively engaging manner with respect to rotational motion with the additional implement 8a.

The particular end of the additional implement 8a appropriately extends with a very small gap spacing up to the inside of the associated side wall 48a or associated support tray 61a, which avoids vegetation between said two surfaces being wound onto the shaft or coupling pin 60 of the implement 8a. This winding protection can be improved in that the inside of the side wall 48a closely surrounds with a collar the end of the additional implement 8a over at least part of its circumference and prevents radially inwardly directed movement of vegetation.

Instead of being planar or angular according to FIG. 4, the casing chamber 37a is in this case arcuate or bounded approximately over 180° following the travel circle 17a and for this purpose the cover wall 41a is channel-like in cross-section. Compared with a rotation direction in the advance direction 16a preference is given to a rotation direction 63 of the additional implement 8a in its lower working area counter to the advance direction 16a or towards the mowing implement 7a. In this rotation direction 63 the work axis 11a is slightly displaced with respect to the median axis of the channel shape of the casing chamber 37a, so that the work axis 11a is slightly closer to the partition 40a than to the front wall 39a. This gives a slightly widened gap in the rotation direction 63 between the travel circle 17a and the inside of the casing chamber 37a, so that vegetation carried from the implement 8a into the chamber 37a is not compacted by sliding along the insides of said chamber 37a and consequently there is no clogging or increasing friction values.

The lower edge of the partition 40a is approximately level with the work axis 11a or is less than ⅕ of the travel circle diameter 17a below it, so that it can serve as a vegetation stripping edge, said vegetation being upwardly movable by the additional implement 8a. The front wall 39a and the partition 40a form the legs of the cross-sectionally U-shaped boundary of the casing chamber 37a and are extended upwards over the connecting area with the cover wall 41 and beyond the same roughly to the height of the approximately planar cover wall 42a, which is connected roughly parallel to the running plane 10a and/or is level with the crest of the cover wall 41a.

The side of the partition 40a facing the mowing implement 9a and optionally the side remote therefrom can be curved about the work axis 12a, so that over at least part of its circumference the implement 9a is located in a cup-shaped casing chamber 38a adapted to its travel circle. In the vicinity of an axial plane of the work axis 12a at right angles to the device 16a, the casing wall jacket can be connected in one piece to the insides of the side walls 48a and its lower edge can, like the partition 40a, be slightly above the lower edge 51a of the side walls 48a. From the casing chamber 38a into the vicinity of or upstream of the mounting support 59a the said lower edge 51a has a roughly constant spacing from the running plane 10a and then rises in acute-angled manner accompanied by the formation of the raised lower edge 49a.

In front of the casing chamber 37a is a further casing chamber 64 substantially continuous over the associated width of the chassis base 3 and which is bounded in the rear area by the front wall 39a and spaced upstream thereof by a further wall, which forms the furthest forward outside of the chassis base 3a and serves as an elastically resilient bumper 65, which is upstream of the wheels 4a in the side view of FIG. 4. Continuous lines in FIG. 4 show the lowest position of the wheels 4a and the dot-dash lines its highest position. In the casing chamber 64 the control shaft 53a is separate from the casing chamber 37a, so that it is not subject to the action of vegetation carried along by the additional implement 8a.

The clutch 30a located on the intermediate shaft 27a has a coupling or clutch member 45a axially displaceable on said shaft 27a and which is immediately adjacent to an end side of the drive roller 28a, which can also form the counter-coupling member. The control device 46a has an angular control lever 66, whose one leg engages in the vicinity of its end with a pressure member, such as a pressure roll, on the end face of the coupling member 45a remote from the counter-coupling member and on whose other leg engages a tightening or tensioning member such as an eccentric and which between its legs is mounted about an axis at right angles to the center axis of the clutch 30a on the chassis base 3a.

The tensioning member is connected to the handle member 47a, so that with the latter the transfer member 66 can be so pivoted that the coupling member 45a is pressed either counter to spring tension in coupling engagement against the pulley 20a or released from the pressure member and can consequently be raised under spring tension in the disengagement position from the pulley 28a. From the pulley 28a the two strands of the driving belt 32a pass with corresponding staggering to the remote circumferential sides of the pulley 23a, so that in the vicinity of the two pulleys 23a,28a they are in approximately right-angled planes to one another.

The lawnmower 1 can advantageously also have a travelling gear 67 by means of which, e.g. only the rear wheels 5 can be engaged and disengaged manually from the guide handle 21 or can be driven in controllable motor manner as regards speed. As compared with a separate motor preference is given to a drive by the drive motor 22.

For this purpose on the driven or mowing shaft 18a between the drive roller 23a and the mowing implement 9a is provided a further drive roller 68 e.g. in the form of a belt pulley, which guides a not shown driving belt rearwards to a gear arrangement or pulley by means of which the wheels 5 are driven. The transmission ratio is chosen in such a way that for at least one advance speed the circumferential speed in the vicinity of the travel circle 17a is higher than the advance or circumferential speed of the running faces of the driven wheels 5 in order to ensure a rearwardly directed relative speed of the drive or engagement area of the additional implement 8a with respect to the ground.

As a function of requirements, the additional implement 8a can have oscillating mounted flat material or flat band prongs as members 69 or 70 engaging in the ground in accordance with FIGS. 1 to 3, 11 and 12 and/or resilient or curved wire prongs according to FIGS. 6 to 10.

The additional implement 8 has a hollow shaft 7 or which can also be formed by a portion of a tube profile, which belongs to the roll core 72 and which passes through a plastic or similar hub body 73. There are slot-like receptacles 74 for the working prongs 69 distributed over the length and circumference of the hub body 73 and which project radially over the same by at least half the cylindrical envelope of the roll core 72 and whose flat cross-sections are in planes roughly at right angles to the work axis 11. In the axial view according to FIG. 12 there are at least four, at the most eight and preferably six working prongs or teeth 69 uniformly circumferentially distributed and in each case a number of prongs 69 corresponding thereto can be in a common plane or a smaller number per prong plane and in particular two oppositely directed, freely projecting prongs 69 are provided on either side of the work axis 11.

The axial spacing between adjacent prong planes is appropriately under 20 mm and is approximately 10 mm, the diameter of the travel circle 17 being advantageously at least 10 cm and at the most 14 or 16 cm and preferably approximately 12 cm. On its inner, substantially axial clearance-free end located in the receptacle 74 each working prong 69 is traversed by a securing member 77, e.g. a bolt, on which it can pivot backwards and forwards-about an axis roughly parallel to the work axis 11 by a predetermined angular quantity and can be automatically radially oriented by the centrifugal forces occurring during rotation. Each receptacle 74 is bounded between two hub flanges 75 formed by the hub body 73 and which can be ring flanges or projections only extending over a partial circumference, so that each prong 69 is to be fixed to a separate securing member 77. Work prongs 69 located in axially adjacent prong planes are continuously reciprocally angularly adjusted about the work axis 11 from one end of the roll core 72 or implement 8 to its other end, so that on the circumferential point of the implement 8 are located only one or two free prong ends.

Figure 12:
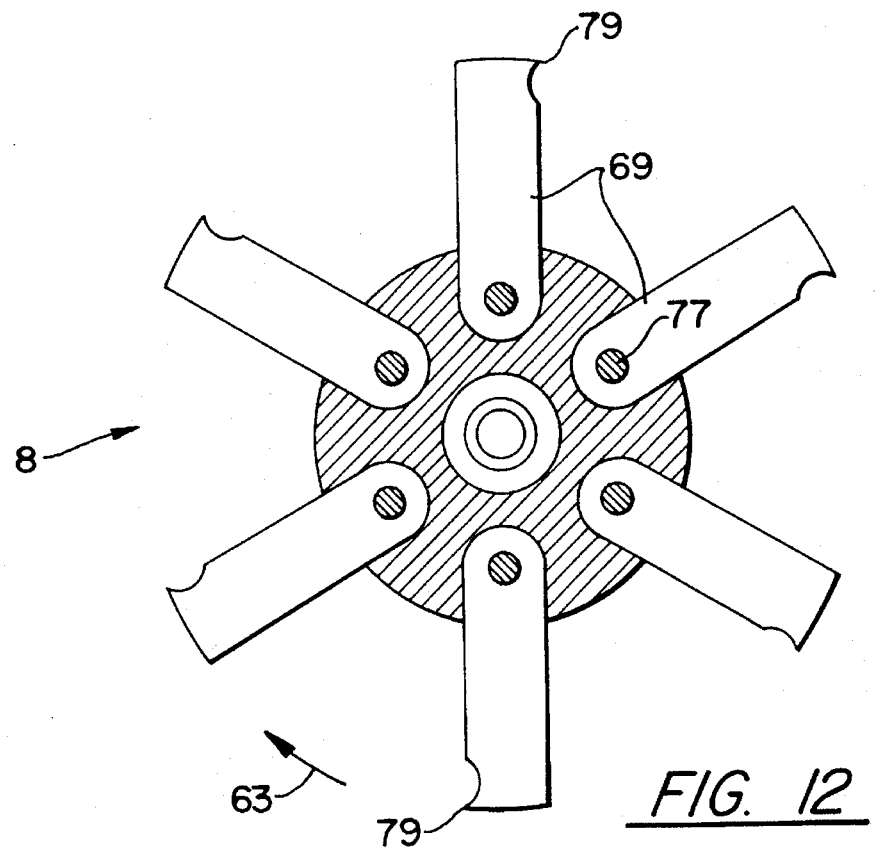

As shown in FIG. 12, the front narrow edges of the working prongs 69 in the rotation direction 63 are constructed at their ends by concavely curved cutouts so as to give acute-angled flanked cutting edges 79, so that they not only have a blunt clearing action in the ground, but also cut into the latter in groove-like manner and can pass below vegetation. The roll core 72 has a through hub opening 76, in which engages the shaft 71 e.g. engaging positively with respect to rotational motion by an injection molding composite.

Figure 11:
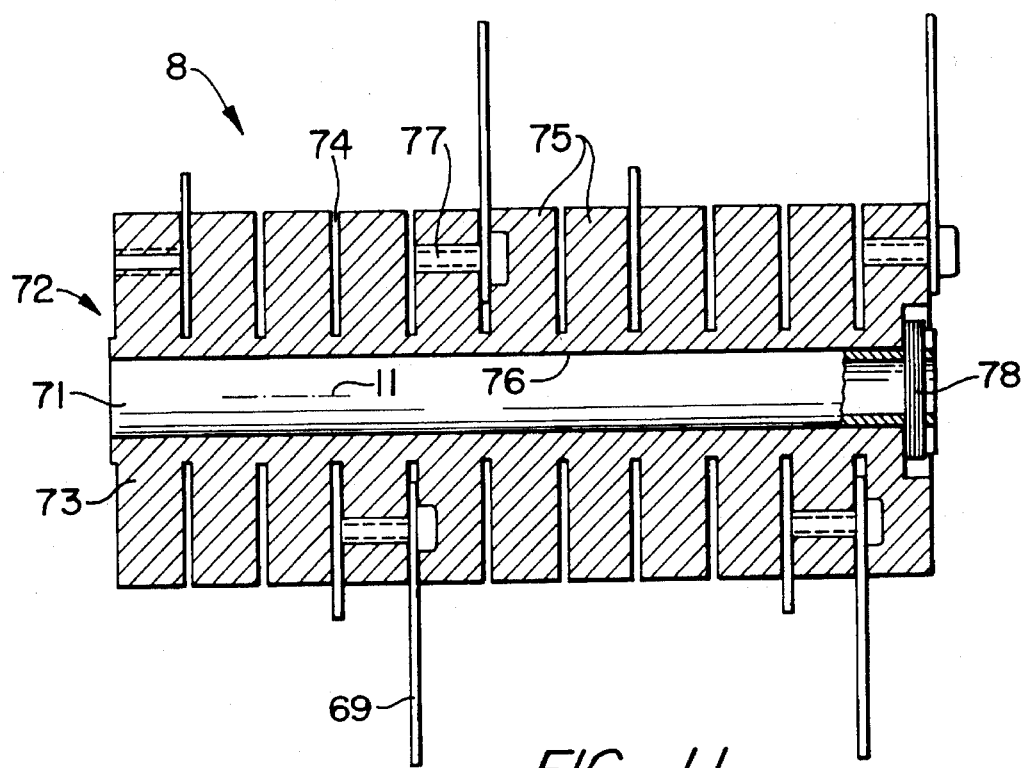

The coupling pin 60 of the drive can e.g. have a transversely projecting coupling member 78, such as a lug, which on mounting the roll core 72 passes into a transverse slot of the shaft 71 and consequently produces the positive rotary connection. The roll body according to FIG. 11 is provided for the center drive according to FIGS. 1 to 3, two such roll bodies being axially lined up on either side of the drive pulley 31 and connecting directly to its end sides, so that there is an effective overall length of the additional implement 8 of at least 30 to 40 cm, because also at the free end faces of the hub body 73 there are working prongs 69, which are not located in the two-sided flanked, slot-like receptacle 74.

The additional implement 8a of FIGS. 6 to 8 is formed from a plurality of identical or randomly interchangeable implement bodies 80, whose hub opening 76a is constructed in such a way that with the shaft 71a it can be assembled in the manner of a toothed shaft connection in a given number of rotary positions, the angular spacing between all the adjacent rotary positions being substantially identical. If this angular distance or spacing is divided by 360°, a number of divisions is obtained and compared with this number the number of implement bodies 80 located on the shaft 71a is greater by one body. As here the angular spacings are 45°, there are nine implement bodies 80 arranged over the entire working width of the implement 8a.

In outer and/or inner cross-section the shaft 71a is substantially square and the hub opening 76a has on said outer cross-section closely adapted square basic shape and in the centre of each square side is provided an angular depression, such as is obtained if two regular and identical polygons are placed on one another rotated mutually by half the arc angle of each polygon side. If 360° is divided by half this arc angle the number of possible rotation positions is obtained.

On the hub body 73a are axially juxtaposed at least two or at the most four or six and in particular three substantially identical working prongs 70 and on both sides of the work axis 11a there are two approximately identical rows with oppositely freely projecting prongs 70. The working prong 70 of the two rows can be axially reciprocally displaced, so that in each case one prong of one row rotates in a prong plane which is roughly in the center between adjacent prongs 70 of the other row.

The hub flanges 75 in this case are constructed as ring flanges and appropriately between in each case two adjacent and external diameter and/or thickness-larger ring flanges is centrally provided a smaller ring flange, which separates two adjacent, ring groove-like receptacles 74a. The axially outermost of the larger hub flanges 75a are traversed by aligned bores, whereas the intermediate larger hub flange or flanges can have in place of a bore a U-shaped incision emanating from the outer circumference.

In the bores are inserted in radial clearance-free manner the securing member 77a in the form of a tubular rivet and then its ends are so widened to form rivet heads, that they engage in axially clearance-free manner on remote end faces of the outermost hub flanges 75a. The radially inner generatrix of the securing member 77a can then be additionally supported in substantially clearance-free manner on the circumferential surfaces of the smaller hub flanges.

Of a particular row only one prong 70 engages in one of the two receptacles 74a between two larger hub flanges 75a, the spacings between adjacent prongs 70 of said row being substantially identical and approximately 15 mm, so that adjacent prong planes can have a spacing between min. 5 and max. 10 mm. This also applies with regards to the facing outermost prong planes of interconnected implement bodies 80.

The working prong 70 is made from spring steel wire or the like and is bent and forms in the vicinity of the fastening to the hub body 73a a spring body 81 in that the wire is shaped into a helical torsion spring with axially closely adjacent turns. This spring body 81 fits in substantially axial clearance-free manner in the associated receptacle 74a and is located substantially radial clearance-free on the securing member 77a, the direction of the helix pitch being so selected that on loading the prong end 79a counter to the rotation direction 63 of the spring body 81 is loaded in the direction of a constriction and consequently with increasing friction closes round the circumference of the securing member 77a. One end of the spring body 81 is continued tangentially in the associated working prong 70, whereas its other end passes tangentially into a support leg 82 roughly aligned with the transition portion of the prong 70 in the axial view of FIG. 7 and which in the same way as the prong 70 is placed on the front circumferential side of the spring bodies 81 in the rotation direction 63.

With its circumferential side at the front in the rotation direction 63 the working prong 70, like the support leg 82, is supported on a common support face 83 of the hub body 73a, which approximately extend up to the outer circumference of the roll core or the larger hub flanges 75a and can be formed by a web-like projection connected to the circumference of the hub bodies 73a and which from the inside of the associated larger hub flange 75a projects axially and/or connects as a reciprocal stiffening axially adjacent, larger hub flanges 75a.

The working prong 70 is located on an end side of a larger hub flange 75a, whereas the support leg 82 engages on the opposite end side of a smaller hub flange. In order to mutually displace the prong planes of the two rows, it is also possible to have a reverse arrangement of the prong components, the thickness of the larger hub flanges 75a being roughly of the same order of magnitude as the width of a receptacle 74a and also the smaller hub flanges can roughly have this thickness. In addition, the spring bodies 81 of the two rows, as a function of requirements, can have opposite or identical helical pitches.

It is also conceivable for one end of the securing member 77 to be supported directly on the associated end, e.g. on the support leg end of an axially outermost spring body 81 and not, as shown, on a hub flange, the end face of said head being roughly in the plane of the associated end face of the hub body 73a. The remote head of the securing member 77a is appropriately countersunk in the outermost end side of the associated outermost hub flange 75a and in said face can also be located the associated end side of the hub body 73a on which can immediately strike the next-following implement body 80 or is connected accompanied by the interposing of an intermediate or spacing ring.

The working prong 70 is curved on its front side in the rotation direction 63 over its freely projecting length in a continuously concave manner with a radius of curvature which is at least as large or is larger than the said length and smaller than twice the said length. If through the free end 79a of the working prong 70 is passed an axial plane of the work axis 11a, then the entire, freely projecting part of the prong 70 is behind said axial plane, the free end with said axial plane forming an acute angle opening towards the roll core 72a of less than 90° or 30° and more than 10°. With loading counter to the rotation direction 63 the working prong 70 can resiliently give way accompanied by a widening of its curvature and it then optionally rises from the support face 83, but returns in whip-like manner on release. As all the prongs 70 of a row are secured by a common securing member 77, an easy installation is ensured. Installation can take place in such a way that the prong 70 and support leg 82 are pretensioned by the widening force of the spring body 81 or engage in clearance-free manner on the support face 83 or have a slight movement clearance with respect thereto.

Figure 9:
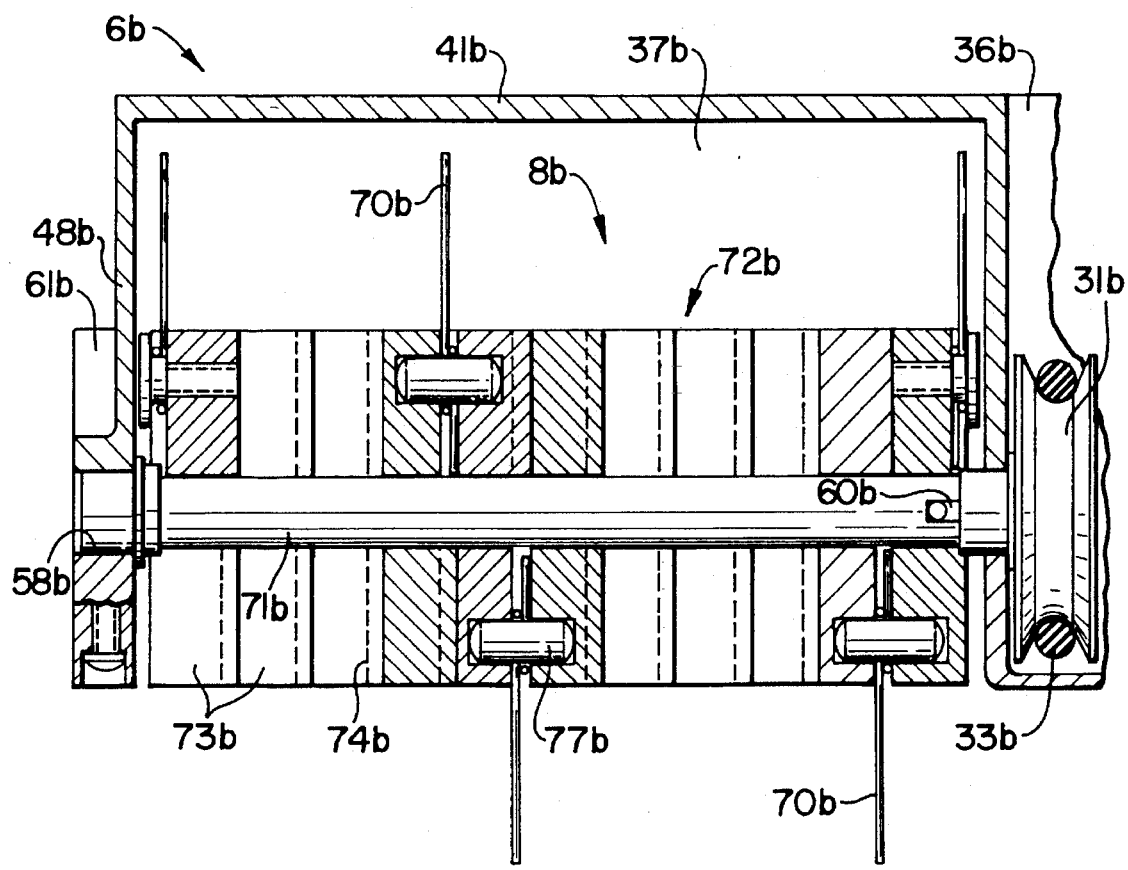

The arrangement according to FIG. 9 is intended for center drive according to FIG. 2 and it is clear that the shaft 36b for receiving the driving belt 33b and the pulley 31b is closed on the underside. The roll core 72b is formed by lined up, ring disk-like, substantially identical hub bodies 73b, which are mounted in directly following manner on the shaft 71b and in each case form receptacles 74b for two oppositely projecting working prongs 70b. These receptacles 74b are in each case defined between two reciprocally supported or engaging faces of two adjacent hub bodies 73b and there is a reception depression in only one face, whereas the other face is continuous and smooth-faced.

The securing member 77b formed by a pressed-in cylindrical bolt and having widened heads, is inserted in aligned blind bores of the two end sides of adjacent hub bodies 73b and forms a connection between the bodies 73b engaging positively with respect to rotational motion, so that they do not have to fixed in this way with respect to the shaft 71b. The working prongs 70b provided on the outermost ends of the roll core 72b are fixed with flat-head screws, which following onto the disk-like head have a thread-free centering portion closely adapted to the internal diameter and length of the spring body 81b.

Figure 10:
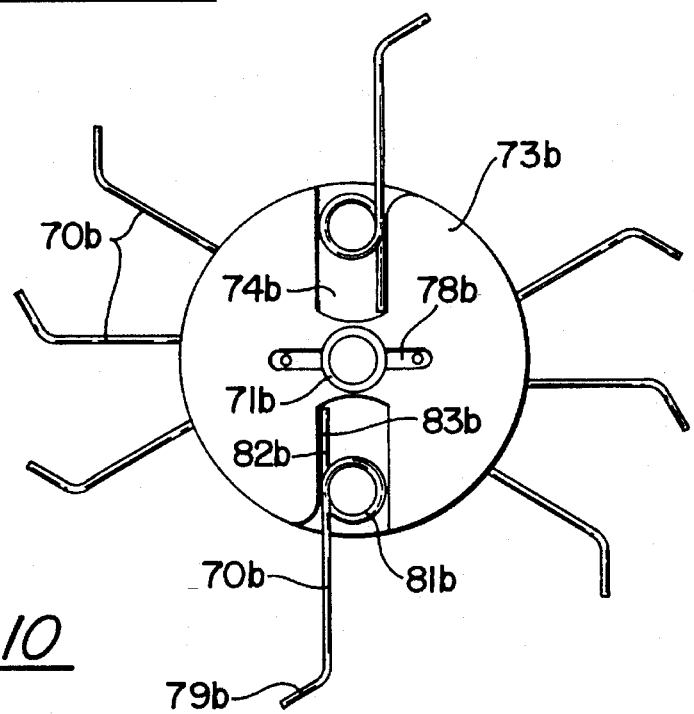

As shown in FIG. 10, in axial view adjacent working prongs 70b can have different reciprocal circumferential spacings. There are four prongs 70b passing linearly from the outer circumference of the roll core 72b, the ends 79b being angled in obtuse-angle manner and are in turn linear. Thus, during revolution, the ends 79b can engage transversely on the ground after which as a result of resilient giving way of the remaining working prong 70b they can be dragged through the ground in this transverse position which is subsequently modified until, accompanied by the underengagement of the moved along vegetation, they spring back into the starting position in the rotation direction and throw the vegetation towards the mowing implement 9 or 9a.

When mowing without operating the upward extraction device 60, the downwardly projecting prongs have no prejudicial action, if they engage slightly in the ground and are dragged along it. In the case of upward extraction without mowing the mowing implement 9 is not prejudicial, because its working plane is above that of the upward extraction device 6. In both cases and with simultaneous mowing and upward extraction, the lawnmower can be pushed or pulled both in the advance direction 16 and opposite thereto and by pressing down or raising the guide handle 21 it can be slightly raised with its front wheels 4 or its rear wheels 5 and can then be turned with wheels still in ground contact as a swinging zone about an axis at right angles to the running plane 10.

In the case of simultaneous upward extraction and mowing appropriately operation takes place in the advance direction 16, so that firstly the vegetation to be removed from the ground is taken up by the upward extraction device 6 and is either placed in the working area of the following mowing device 7 or is thrown directly into the mowing implement 9. The latter then takes the vegetation together with the vegetation which it has cut and passes it over the shortest journey to a storage container 84, which is fixed in removable manner to the rear end of the chassis base 3. When moving the lawnmower counter to the advance direction 16 firstly the mowing device 7 cuts the vegetation above the running plane 10 and removes it from the working area of the following upward extraction device 6, so that the latter can engage better in the ground and transfer directly to the mowing implement 9 the vegetation which it has detached, because there is no further casing chamber between the two chambers 37,38.

The upward extraction device 6 is also suitable for uprighting any horizontally positioned vegetation without releasing it from the ground, so that the mowing implement 9 can subsequently more easily cut the same. The working plane 13 of the upward extraction device 6 can be approximately 5 mm or at least 10 to 20 mm below the running plane 10. The speed of the additional implement 6 can be at least 2000 to approximately 3000 revolutions per minute, so that said actions are further improved and it is also possible to construct the additional implement as a sweeping tool or brush roller.

The additional implement preferably is a scarifier exerting a different work such as extracting vegetation and ground particles from the soil without affecting deeper root particles or main plants of a densely closed vegetation, undergripping and ripping out only superficially rooting vegetation plants while leaving deeper rooting vegetation plants substantially unaffected, superficially grooving the ground or soil in a screen distribution wherein the worked and grooved areas are substantially smaller than the ungrooved areas, lifting the freed particles from the ground in an upward motion and conveying as well as discharging them in a continuous arc motion, and superficially ploughing the ground by a drag motion in a micro-ploughing manner. All these works can be done with and without advance motion and without pliers-like gripping in a multitude of spacedly juxtaposed zones.

With the mowing tool respective the additional implement is associated a conveyor, like a fan, for example by providing the mowing tool as a conveyor fan which directly receives the particles discharged from the additional tool via a throw motion whereby the particles do not have to get into physical touch with the conveyor fan but can be subjected to an air flow created by the conveyor fan and the additional tool and therefore given a further motion energy to continue the throw motion away from the additional and the mowing tool in a directly succeeding second throwing loop towards and up to a final discharge outlet of the working device or lawn mower. In particular, the ends of mower wings of the mowing tool provide lower and upper fan surfaces at an angle to their motion plane respectively running plane parallel thereto, whereby these vent creating surfaces can be achieved by bent end sections of the mowing arms simultaneously providing cutting edges substantially in a same plane as the remainder of the mowing arms cutting edge. Also a fan rotor can be provided separate from the named mowing tools but on the same driven axis or axially directly adjacent and in the same chamber.

To achieve an optimum of work for different ground conditions both the implements or tools may reciprocally independently be continuously adjustable in height with respect to each other and with respect to one or more mutually spaced ground support or spacing surfaces as provided by the wheels and/or skids which orient the chassis base in an inherently stable orientation with respect to the ground while simultaneously permitting advance motions parallel to the ground without influencing this specific orientation.

The additional working tools or prongs preferably have an untensioned free idle motion over an idle path parallel to their working or advance motion, in the tools transverse direction or in a direction substantially at right angles to the advance motion but parallel to the running plane and/or in an inclination or tilting direction transverse to the longitudinal direction of the additional tool or sidewards with respect to the running plane and the working motion. These motions are restricted by abutments provided on the hub body 73a or hub flange 75a, whereby the counter-member for these abutment surfaces is preferably only the support leg 82 and not the prong 70 although this would be possible. Thereby the named motion play is individually and separately provided for each of the working tools 70 and the motion play can amount substantially between at least 2° to 5° and at the most 40° to 50°, whereby the circumferential motion play is bigger than the axial or sidewards motion play. To commonly provide all these motion plays a corresponding radial motion play can be provided between the inner circumference of the hub or spring body 81 and the outer circumference of the securing member 77a while simultaneously having an axial motion play of the hub body 81 between the associated lateral flanges 75a. In the laterally tilted end positions of the tool 70 still a small radial motion play of hub body 81 may be given with respect to the holding member 77a since these lateral end positions may be stop limited by the hub member 73 or the opposing lateral faces of flanges 75a.

The leg 82 can protrude to its free end substantially in the same direction as the working leg 70 and can rearwardly diverge with respect to the main radial inner section of the leg 70 at an angle bigger than the named motion angles, this angle being at least 30° and at the most 90°, preferably about 45°. When the working end of the tool 70 engages a resistance like the ground during its working or advance motion, the named stop faces will come into a positively abutting engagement and the tool will be pretensioned against the resistance of this engagement. When after this the so deflected tool 70 comes out of engagement from the resistance, it will return under the tension in a counter-direction but will not at once be tensioned into the counter-direction by the return energy since it can freely move over the name idle path to thereby freely absorb the energy merely by friction until it is stopped in its motion by positive return abutment. Thereby the materials of respective the tool members 70, 81, 82, 83, 80, 71a, 73a, 75a, 77a themselves are effectively preserved from damage, for example by alternating loads. The working engagement of the tools 70 mainly takes place only in the orbit of the tool 8a although this orbit is self-restoringly variable under the occuring working loads.

We claim:

1. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), at least one of said working implements (8) providing at least one of said additional implement (8) positively driveable by said drive means (20) including at least one drive arrangement, common with working tools (70) of at least two of said working implements (8,9) being reciprocally rotational and arranged behind one another, in directly adjacent succession with respect to said advance direction (16) in a view on said running plane (10) and in an operational state, a clear distance between orbits of working tools of said mowing implement and of said additional implement being smaller than a working radius of an orbit of said additional implement (8), said chassis (2a)including ground supporters (4a,5) defining lateral running tracks, said additional implement (8a) extending between said running tracks and being located in a casing chamber (37a)separate from said mowing implement (9a).

2. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to perform working motions, said working implements (8,9) being at least partly separately mounted and determining working areas, and a drive means (20) for driving at least one of said working implements (8,9) substantially independently of said advance motion of said chassis (2), wherein at least two of said working implements (8) of at least two of said working devices (6,7) are commonly integrated on said chassis (2), at least one of said working implement (8) providing at least one of said additional implement (8) positively driveable by said drive means (20) including at least one drive arrangement, both said working implements (8,9) being located directly adjacent to two remote sides of a single intermediate inherently substantially rigid shield unit (40), said working implements (8,9) having work axes (11,12) oriented substantially at right angles with respect to one another.

3. The lawnmower according to claim 2, wherein at least one of said working implement (8a) has projecting substantially resilient working prongs (70) axially and circumferentially distributed over a circumference of a roll core (72a), at least one of said additional implement (8a) being assembled from at least one of substantially identical and axially lined up implement bodies (80), and implement bodies (80) which independently of reciprocal interengagement are securable against rotation in reciprocally displaced rotation positions, at least one of said implement bodies (80) having a hub body (73a) providing a roll core (72a) and an implement hub (76a) positionally positively securable in variable rotation positions by axial plug mounting on a profile shaft (71a).

4. The lawnmower according to claim 2, wherein at least one of said working implement (8a) provides a number of axially lined-up implement bodies (80), said number being between equal and bigger than a number of variable rotation positions in which at least one of said implement bodies (80) is assemblable.

5. The lawnmower according to claim 2, wherein at least one of said additional implement is a scarifier for at least one of extracting vegetation and ground particles from a soil ground, ripping out the particles from the soil ground, scarifying vegetation and soil to provide venting breaches, picking up, lifting, conveying and discharging particles in a continuous motion without gripping, and drag micro ploughing above lower vegetation root parts while leaving most of the plants substantially unhurt and alife in the soil.

6. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, a drive means (20) for driving at least one of said working implements (8,9), wherein at least two of said working implements (8,9) of at least two of said working devices (6,7) are commonly integrated on said chassis (2), and setting means for substantially independently selectively transferring at least two of said working implements (8,9) including said mowing implement into and out of working engagement by displacing said working implements with respect to said running plane (10), said chassis (2) including a chassis base (3) and ground supporters (4,5) defining lateral running tracks, said ground supporters (4,5) being commonly adjustable with respect to said chassis base (3) by said setting means.

7. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, and a drive means (20) for driving at least one of said working implements (8,9) wherein at least two of said working implements (8,9) of at least two of said working devices (6,7) are commonly integrated on said chassis (2), at least one of said additional implement (8) being driveable independently of another of said working implements (9,8) and of a travelling drive (67) provided for positively driving said chassis (2) in said advance direction (16).

8. A lawnmower (1) comprising;

a chassis (2) determining a running plane (10) and a main operational advance direction (16) of an operational advance motion; at least two working devices (6,7) including a mowing device (7) and a ground working device, said working devices (6,7) providing working implements (8,9) including at least one mowing implement (9) and at least one ground working additional implement (8) to perform positively driven working motions, said working implements (8,9) being at least partly separately mounted and determining working areas, a drive means (20) for driving at least one of said working implements (8,9) wherein at least two of said working implements (8,9) of at least two of said working devices (6,7) are commonly integrated on said chassis (2), and setting means (50) for commonly adjusting working planes (13,14) of at least two of said working implements (8,9) with respect to said running plane (10) in a height direction oriented transverse to said working planes (13,14), said chassis (2) including four separate ground supporters (4,5) mounted on a chassis base (3) of the chassis, with said setting means (50) at least two of said ground supporters (4,5) being commonly adjustable with respect to said chassis base (3).

9. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to perform positively driven working motions, said working implements (8,9) being at least partly separately mounted and determining working areas, and a drive means (20) for driving at least one of said working implements (8,9) wherein at least two of said working implements (8,9) of at least two of said working devices (6,7) are commonly integrated on said chassis (2), for an inherently stable ground support in the working state of both said working implements (8,9) said chassis (2) providing a plurality of wheels (4,5), substantially all said wheels (4,5) being commonly adjustable in height together with respect to a chassis base (3) of said chassis (2), said chassis base (3) carrying said working implements (8,9) and said drive means (20).

10. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to perform positively driven working motions, said working implements (8,9) beginning in operation at least partly separately mounted and determining working areas, and a drive means (20) for driving at least one of said working implements (8,9), wherein at least two of said working implements (8,9) of at least two of said working devices (6,7) are commonly integrated on said chassis (2), said chassis (2) having front and rear ground supporters (4,5), at least two of said working implements (8,9) being adjustable over control paths with respect to said running plane (10), said front and rear ground supporters (4,5) being separate but commonly adjustable in positively constrained control connection with respect to a chassis base (3).

11. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), said chassis (2) having a chassis base (3) and lateral ground supporters (4,5) for continuously displaceably engaging the ground in said running plane (10), at least one of said ground supporters (4,5) defining a central axis (15) and being adjustable in a pivot motion about at least one control axis (53) oriented parallel to said central axis (15), at least one of said control axis (53) positively interconnecting at least two of said lateral ground supporters (4) of said chassis (2) and being spaced from said additional implement (8).

12. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), said chassis (2) having at least one control axis (53) for adjusting height of a ground supporter (4,5), said control axis (53) being substantially level with a work axis (11) of said additional implement (8), a central supporter axis (15) of said particular ground supporter (4,5) being oriented substantially parallel to said running plane and adjustable in at least one position above said work axis (11) of said additional implement (8) when in an operational working position.

13. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), when in an operational working position a lowermost working zone of at least one of said additional implement (8) being located behind at least part of a frontal ground support zone of said chassis (2) including a chassis base (3), said chassis base (3) including lateral walls (48) for laterally protectingly shielding said additional implement (8) and said mowing implement (9), lower edges (49,51) of said lateral walls (48) being located higher in the vicinity of said additional implement than in the vicinity of said mowing implement.

14. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), said chassis (2) having lateral ground supporters (4), at least one of said additional implement (8) being located between said lateral ground supporters (4) provided for supporting said chassis (2) during mowing operation, in an operational working position at least one of said additional working implement (8) projecting at least partly rearwardly past said ground supporters (4) and a ground contact zone of said ground supporters (4), said chassis (2) including a chassis base (3) having at least one lateral wall (48a) defining a wall outside and laterally shielding said additional implement (8a), said drive means (20) including a gear stage (26a) located on said wall outside and in a casing shaft (36a).

15. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), said chassis having lateral frontal and rear ground supporters (4,5) including at least one frontal and one rear ground wheel (4,5) running in a common track, rear ground supporters (5) being spacedly remote from at least one of said additional implement (8), in side view at least one of said rear ground supporters (5) extending substantially up to said working area of said mowing implement (9), at least one of said rear ground wheel (5) having an outer diameter substantially larger than an outer diameter of at least one of said frontal ground wheel (4).

16. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to perform working motions, said working implements (8,9) being at least partly separately mounted and determining working areas, and a drive means (20) for driving at least one of said working implements (8,9), substantially independently of said advance motion of said chassis (2), wherein at least two of said working implements (8,9) of at least two of said working devices (6,7) are commonly integrated on said chassis (2), at least one of said working implements (8) providing at least one of said additional implement (8) positively driveable by said drive means (20) including at least one drive arrangement, on at least one of a top side and at least one lateral side at least two of said working implements (8,9) being substantially entirely shieldingly received in at least one downwardly open casing chamber (37,38), for at least two of said working implements (8,9) a common casing (35) with a single upright partition (40) being provided for subdividing two juxtaposed casing chambers (37,38), at least one of said additional implement (8) being circumferentially surrounded by a cover wall (41a).

17. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to perform working motions, said working implements (8,9) being at least partly separately mounted and determining working areas, and a drive means (20) for driving at least one of said working implements (8,9) substantially independently of said advance motion of said chassis (2), wherein at least two of said working implements (8,9) of at least two of said working devices (6,7) are commonly integrated on said chassis (2), at least one of said working implements (8) providing at least one of said additional implement (8) positively driveable by said drive means (20) including at least one drive arrangement, said mowing implement (9) being directly drive-connected to a drive motor (22) provided also to drive said additional implement (8), a driven shaft (18) of said drive motor (22) and a mowing shaft (18) of said mowing implement (9) being drive-connected with at least one of said additional implement by means of a gear unit (24) located at least partly above at least one of said additional implement (8), at least one gear member (28,32,46) of said gear unit (24) being at least one of:

located in a gear chamber (36) separate from at least one of said working implements (8,9), and accessible by opening an upper, removable casing cover (44).

18. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), at least one of said additional implement (8a) being driven by means of a single-stage gear unit (24a), connecting said at least one additional implement (8) with an output shaft (18) of a drive motor (22).

19. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, a drive means (20) for driving at least one of said working implements (8,9), wherein at least two of said working implements (8,9) of at least two of said working devices (6,7) are commonly integrated on said chassis (2), and clutch means (30a) for driving at least one of said working implement (8a,9a), said clutch means (30a) being manually operable substantially independently of working positions of said working implement (8a,9a), said clutch means (30a) being provided for discoupling at least one of said additional implement (8a) from at least one of said drive arrangement (20a), and said mowing implement (8a) while simultaneously positively driving said chassis (2) in said advance direction (16) with said drive means (20a), at a rear end of said chassis (2a) a guide handle (21) for manually guiding the lawnmower in operation being provided, both said clutch means (30a) and drive clutch means for discoupling said drive means (20a) from at least one rear ground supporter wheel (5) being manually operable at said guide handle (21).

20. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, a drive means (20) for driving at least one of said working implements (8,9), wherein at least two of said working implements (8,9) of at least two of said working devices (6,7) are commonly integrated on said chassis (2), and a clutch (30a) for driving at least one of said working implements (8a) separate from at least one working shaft (18a,71a) of at least one of said working implements (7a,8a), an operationally disengageable coupling member of said clutch (30a) providing a gear member and a belt pulley (28a) for a driving belt (32a).

21. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), said drive means (20a) being provided for commonly positively driving said advance motion of said chassis (2a) and said working motion of at least one of said working implements (8a,9a), both said advance motion and said working motion being affected by a common driven shaft (18a), at least one of said additional implement (8a) being driveable commonly with driving said advance motion, manually operable clutch means (30a) being provided for discoupling at least one of said additional implement (8a) from said drive means (20a) while simultaneously driving said advance motion, said at least one additional implement (8a) being located in front of said mowing implement (9a) in a casing chamber.

22. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to perform working motions, said working implements (8,9) being at least partly separately mounted and determining working areas, a drive means (20) for driving at least one of said working implements (8,9) substantially independently of said advance motion of said chassis (2), wherein at least two of said working implements (8,9) of at least two of said working devices (6,7) are commonly integrated on said chassis (2), at least one of said working implements (8) providing at least one of said additional implement (8) positively driveable by said drive means (20) including at least one drive arrangement, and communication means for passing over and delivering freed vegetation particles substantially without intermediate ground contact from at least one of said additional implement (8a) towards said mowing implement (9a), wherein in said working zone a particle effective working direction of at least one of said additional implement (8a) is directed towards said mowing implement (9a), said working zone being connected with said mowing implement by a free trajectory for the vegetation particles, said mowing implement (9a) providing at least one of a disposal conveyor for conveying the vegetation particles extracted by at least one of said additional implement (8a) only away from said working implements, a disposal conveyor for conveying the vegetation particles in a storage container (84), and a conveyor fan creating a conveying suction with respect to at least one of said additional implement (8a) and a conveying pression away from both said working implements (8a,9a).

23. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to perform working motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), at least one of said working implements (8) providing at least one of said additional implement (8) positively driveable by said drive means (20) including at least one drive arrangement at least one of said working implements (8a) being assembled from at least two implement bodies (80), each of said implement bodies (80) having a base hub body (73a) and between one and a plurality of working tools (70) provided in juxtaposed and substantially diametrically opposite orientation.

24. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), at least one of said working implements (8a) having a plurality of juxtaposed working tools (70) axially lined up along a central working axis (11,11a) of said working implement (81) and radially positionally secured with a common securing member (77a), said working tools (70) being mounted to operationally oscillate about an oscillating axis oriented substantially parallel to said working axis.

25. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to perform working motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), at least one of said working implements (8) providing at least one of said additional implement (8) positively driveable by said drive means (20) including at least one drive arrangement, at least one of said working implements (8a) having at least one hub body (73a) provided with at least one working tool (70), at least one of said hub body (73a) providing spacedly juxtaposed hub flanges (75a) and bounding at least one receptacle (74a) for said working tool (70), one single working tool (70) being located in an individual one of said at least one receptacle (74a), at least one of said hub flanges (75a) being substantially annular, at least one of said hub flanges (75a) being traversed by at least one securing member (77a).

26. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), in mowing operation at least one of said additional implement (8a) providing a furthest forward front working implement (8a) of the lawnmower, said front working implement (8a) being rotatable about an axis (11a) substantially parallel to said running plane (10a), said chassis (2a) including ground supporters (4a,5) defining lateral running tracks, said additional implement (8a) extending between said running tracks and being located in a casing chamber (37a) separate from said mowing implement (9a).

27. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to perform working motions, said working implements (8,9) being at least partly separately mounted and determining working areas, and a drive means (20) for driving at least one of said working implements (8,9) substantially independently of said advance motion of said chassis (2), wherein at least two of said working implements (8,9) of at least two of said working devices (6,7) are commonly integrated on said chassis (2), at least one of said working implements (8) providing at least one of said additional implement (8) positively driveable by said drive means (20) including at least one drive arrangement, at least one of said additional implement (8a) being located behind a front casing wall (39a,65) of said chassis (2a).

28. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), in a highest position at least one of said additional implement (8a) being positioned above said running plane (10a), with respect to said running plane (10a) in said highest position an orbit top of at least one of said additional implement being substantially level with a top of at least one ground supporter wheel (4a) having an axis substantially parallel to said running plane (10).

29. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), both said working implements (8,9) being located directly adjacent to two remote sides of a single intermediate inherently substantially rigid shield unit (40), said working implements (8,9) having work axes (11, 12) oriented substantially at right angles with respect to one another, a gear chamber (36a) being provided directly above said additional implement (8a) and connecting said mowing implement with said additional implement.

30. A lawnmower (1) comprising:

a chassis (2) determining a running plane (10) and a main operational advance direction (16) of an operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), said chassis (2) having a chassis base (3) and lateral ground supporters (4,5) for continuously displaceably engaging the ground in said running plane (10), at least one of said ground supporters (4,5) defining a central axis (15) and being adjustable in a pivot motion about at least one control axis (53) oriented parallel to said central axis (15).

31. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), said drive means (20) having a gear unit, at least one gear member (28,32,46) of said gear unit (24) being located in a gear chamber (36) separate from at least one of said working implements (8,9) and accessible by opening an upper, removable casing cover (44).

32. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), communication means provided for passing over and delivering freed vegetation particles substantially without intermediate ground contact from at least one of said additional implement (8a) towards said mowing implement (9a), wherein in said working zone a particle effective working direction of at least one of said additional implement (8a) is directed towards said mowing implement (9a), said working zone being connected with said mowing implement by a free trajectory for the vegetation particles, said mowing implement (9a) providing a disposal conveyor for conveying the vegetation particles extracted by at least one of said additional implement (8a) only away from said working implements.

33. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), at least one of said working implements (8a) having at least one hub body (73a) provided with at least one working tool (70), at least one of said hub body (73a) providing spacedly juxtaposed hub flanges (75a) and bounding at least one receptacle (74a) for said working tool (70), said hub flanges being traversed by at least one securing member (77a).

34. A lawnmower (1) comprising:

a chassis (2) determining a running plane (10) and a main operational advance direction (16) of an operational advance motion;

at least two working devices (6,7) including a mowing device (7) and a ground working device, said working devices (6,7) providing working implements (8,9) including at least one mowing implement (9) and at least one ground working additional implement (8) to operationally perform positively driven working motions, said working implements (8,9) being at least partly separately mounted and determining working areas, and a drive means (20) for driving at least one of said working implements (8,9), wherein at least two of said working implements (8,9) of at least two of said working devices (6,7) are commonly integrated on said chassis (2), at least one of said additional implement (8a) being located directly behind at least one front casing wall (39a,65) of said chassis (2a), a lateral wall (48) providing a protection shield between said additional implement and a lateral ground supporter (4) of said chassis.

* * * * *